(12) United States Patent
Murayama

(10) Patent No.: US 6,192,163 B1
(45) Date of Patent: Feb. 20, 2001

(54) IMAGE PROCESSING METHOD AND IMAGE PROCESSING APPARATUS

(75) Inventor: Yasuhiko Murayama, Suwa (JP)

(73) Assignee: Seiko Epson Corporation, Tokyo (JP)

( * ) Notice: Under 35 U.S.C. 154(b), the term of this patent shall be extended for 0 days.

(21) Appl. No.: 08/960,343

(22) Filed: Oct. 29, 1997

(30) Foreign Application Priority Data

Oct. 29, 1996 (JP) .................................................. 8-286906

(51) Int. Cl.$^7$ ................................. G06K 9/40; G06K 9/48
(52) U.S. Cl. ........................................... 382/274; 382/199
(58) Field of Search .................................... 382/199, 270, 382/274, 176; 358/461

(56) References Cited

U.S. PATENT DOCUMENTS

| | | | |
|---|---|---|---|
| 4,402,087 | * 8/1983 | Sakamoto et al. | 382/273 |
| 4,524,388 | * 6/1985 | Abe et al. | 348/251 |
| 4,695,884 | * 9/1987 | Anastassiou et al. | 348/615 |
| 4,760,464 | * 7/1988 | Sakano | 358/461 |
| 4,829,379 | * 5/1989 | Takaki | 348/251 |
| 4,984,285 | * 1/1991 | Kano et al. | 382/270 |
| 5,099,341 | * 3/1992 | Nosaki et al. | 358/461 |
| 5,181,118 | 1/1993 | Kimura . | |
| 5,189,556 | * 2/1993 | Ohtsuka | 359/634 |
| 5,253,083 | 10/1993 | Hirota . | |
| 5,260,809 | 11/1993 | Tachikawa . | |
| 5,267,055 | 11/1993 | Sakamoto et al. . | |
| 5,317,421 | * 5/1994 | Ito | 358/464 |
| 5,621,824 | * 4/1997 | Ijiri et al. | 382/274 |
| 5,838,463 | * 11/1998 | Gahang | 358/465 |
| 5,854,853 | * 12/1998 | Wang | 382/176 |

OTHER PUBLICATIONS

Denki Tsushin Gakkai Ronbun Magazine, Nobuyuki Otsu, "An Automatic Threshold Selection Method Based on Discriminant and Least Squares Criteria", 80/4 vol. J63–D No. 4, pp. 349–356.

Technical Report of IEICE, Ginga Nagamine et al., "A Study of Thresholding Method for Character Image from CCD Camera", IE96–21 Jun. 1996, pp. 45–50.

\* cited by examiner

Primary Examiner—Amelia Au
Assistant Examiner—Martin Miller
(74) Attorney, Agent, or Firm—Oliff & Berridge, PLC

(57) ABSTRACT

A background predicting process is disclosed which determines, for each designated line of input image data, whether or not the pixels of a particular line are the edge portion of a line drawing. The process finds the brightness value for each pixel, excluding the effects of the brightness of the edge portion in the line drawing (step s1). Next, a background prediction modifying process is accomplished which determines whether or not the effects of a line drawing portion other than the edge are included in the brightness value of each pixel in the line being processed. When the effects of a line drawing portion other than the edge are included, the process finds the brightness value of each pixel excluding this effect (step s2). A background modification is then conducted by modifying the brightness so as to achieve a desired brightness value on the basis of the brightness value of each pixel obtained by this background prediction modifying process (step s3).

15 Claims, 15 Drawing Sheets th [ 2 ], th [ 3 ] ······ SET SO AS TO DIVIDE TOTAL OF CUMULATIVE NUMBER OF PIXELS INTO (n-1) EQUAL PARTS

IMAGE PROCESSING METHOD AND IMAGE PROCESSING APPARATUS

BACKGROUND OF THE INVENTION

1. Field of Invention

The disclosed invention relates to image processing technology in video and image-related equipment. In particular, the invention relates to an image processing method and image processing apparatus suitable for correcting the shading of an image photographed by a sensor such as a CCD camera or the like in which shading (a difference in brightness caused by illumination unevenness) is created.

2. Description of Related Art

In images photographed by an area sensor, such as a CCD camera or the like, a dark shadow may appear in the image after digital processing because of the effects of shading. In particular, the effects of shading often appear in the areas near the edge of the image (the periphery of the image). Furthermore, in contrast to taking natural images such as scenery, when an image is taken of line drawings, such as diagrams or characters in a uniform background color, the effects of shading are striking in the image and do not look good.

Compact portable information processing equipment has recently been commercialized which allows not only handwritten input information, but also images to be uptaken by using a CCD camera or the like. This compact portable information processing equipment is provided with a display unit for simultaneously uptaking and displaying the uptaken information, and for reading and displaying information already uptaken. Out of consideration for battery life, a reflective liquid crystal display device (LCD) is commonly used as the display unit for this type of compact portable equipment.

The LCD generally has a small number of display gradations (color shades or gray scale) and, for example, four gradations are frequently used. In contrast to this, a CCD camera using a CCD photography device has 256 gradations (color shades or gray scale), which is a large number of gradations. Accordingly, when the image uptaken by the CCD camera is displayed on the LCD, it is necessary to reduce the number of gradations.

When the process for reducing the number of gradations is performed, in converting, for example, an image in which the periphery is dark because of the effects of the kind of shading discussed above to four gradations, there are cases where the post-processing image has dark areas on the periphery that appear to be smeared black.

Hence, for images that have received the effects of shading, it is necessary to revise the effects of this shading.

In accordance with a conventional method of shading correction, the image data of one screen that has the effects of shading is uptaken, following which the screen is partitioned into several regions so as to have similar brightness, and a process is performed so that the whole screen has a smooth change in brightness (see Shingaku Giho, IE 96-21, 1996-09, "Research on Binarization of Images Uptaken by CCD Cameras").

Conventionally, shading correction involves a process that uptakes one screen of image data and partitions it into several regions. Consequently, a memory having a large enough capacity to store at least one screen of image data is necessary for working memory.

However, CCD cameras are often used in compact equipment. In particular, it is expected that use in portable information processing equipment, such as electronic notebooks, will further increase in the future. In this kind of equipment, compactness, light weight, and low cost are desired. Hence, there are great restrictions on the components used. Accordingly, it is desirable to use as small a working memory as possible.

In addition, objects photographed by the CCD camera may not only be line drawings, but also may be natural images such as scenery. When these kinds of images are displayed on a display unit with a small number of gradations, as described above, it is necessary to conduct a process for reducing the number of gradations (e.g., a process to go from 256 gradations to 4 gradations).

Processes for reducing the number of gradations include the "Ohtsu method" (see the Denki Tsushin Gakkai Ronbun Magazine, '84/4, vol, J63-D, No. 4, pg. 349), the error diffusion method and the dither method.

The aforementioned "Ohtsu method" is a technology suited for setting the threshold values used in binarization. By using this in the case of conversion to four gradations, a process is first conducted for setting the threshold value used in binarization, and then a process is conducted which finds the respective threshold values for the respective regions partitioned using this first threshold value. This method requires a large volume of computations, but is an effective method for images such as line drawings in which preserving the clarity of the edge is necessary.

On the other hand, the error diffusion method and the dither method are methods that output gradations two dimensionally, and consequently have the defect that it is difficult to preserve the edge. Hence, when an image such as a line drawing with characters or diagrams in the midst of a bright background is uptaken and the gradation conversion process is performed, the edge portions of the line drawing containing the most meaningful information become unclear, and a quality image cannot be obtained.

Thus, for line drawings, such as characters or diagrams, a binarization process using a specific threshold value in accordance with the Ohtsu method or the like is appropriate. For natural images, the error diffusion method and the dither method which output gradations two-dimensionally are appropriate. Accordingly, in order to reduce the number of gradations, it is desirable to execute a gradation process, i.e., a halftoning process or an indexing process, for example. In particular, the dither method or an error diffusion process may be used. The type of gradation process is selected in accordance with whether the object is a line drawing or a natural image.

SUMMARY OF THE INVENTION

It is an object of the invention to reduce the volume for working memory, to make the apparatus more compact and lighter in weight, to reduce costs, and to eliminate the effects of shading for each designated line for line drawings. In line drawings such as characters or diagrams the effects of shading often appear in a striking manner.

By combining the shading correction and an n gradation conversion process using n−1 threshold values, the effects of shading can be eliminated on photographed images that have shading, while also reducing the gradations in a state with edges present. Furthermore, by determining whether or not the image is a line drawing and performing a process in which shading correction is accomplished only when the image is a line drawing, it is possible to accomplish the shading correction process only for line drawings, making it possible to reduce processing and shorten processing time.

The invention determines whether or not the image is a line drawing, accomplishes shading correction, performs a gradation process using n−1 threshold values if the image is a line drawing, and accomplishes a process wherein a gradation process is undertaken using a gradation process method suitable for natural images if the image is not a line drawing. The disclosed invention aims to display a quality image by automatically accomplishing a process suitable for the photographed image regardless of the photographed image being displayed.

In order to achieve the above objectives, the image processing method of the disclosed invention comprises an image processing method, wherein for each designated line of input image data, a determination is made as to whether or not the pixels comprising that line comprise the edges of a line drawing. A background predicting process is also conducted which finds the brightness value for each pixel, excluding the effects of the brightness of the edge portion in the line drawing. Following this, a determination is made as to whether or not the effect of the line drawing other than the edge portion is included in the brightness value for each pixel in the lines to be processed obtained from this background predicting process. When the effects of the line drawing other than the edge portion are included, a modifying process for the background prediction is conducted which finds the brightness value for each pixel excluding this effect. A background correcting process is then conducted to correct the brightness value and achieve the desired brightness value on the basis of the brightness value of each pixel obtained by the background prediction modifying process.

According to an embodiment of the invention, a determination is made for each designated line of input image data as to whether or not the pixels that comprise that designated line are pixels that comprise the edge portion of a line drawing. When the pixels do not comprise the edge, the brightness values of the pixels being processed are found using a computation on the basis of the brightness values of the pixel positions corresponding to the line previously processed. The brightness values processed prior to this are updated using the brightness values which are found. When the pixels comprise the edge, a process which does not change the brightness values of the pixel positions corresponding to the line previously processed is repeatedly executed for each pixel comprising the designated line one designated line at a time. Accordingly, a background predicting process is accomplished which finds the brightness value of each pixel for each designated line excluding the effects of the brightness of the edge portions in the line drawing.

When the brightness value for each pixel in the designated line obtained in this background predicting process is determined to be the desired brightness value or less, a designated search range is set which includes the pixels having this brightness value. The change in brightness from the adjacent pixels within this search range is found for each pixel, and when the number of pixels in which there is little change in brightness within the search range is not less than a preset number, the brightness value is determined on the basis of the brightness value of the pixels with little change in brightness. When the number of pixels with little change in brightness in the search range is smaller than a preset number, the brightness value is determined on the basis of the brightness values of the pixels over the entire search range, and the modifying process for the background prediction results is accomplished using this determined value.

The result of modifying the background prediction result using the modifying process and the brightness value set as the desired value are compared. The difference between these is found, and a background correction to achieve the desired brightness value is accomplished by adding the difference that is found to the brightness value of the pixel position corresponding to said input image data.

Thus, with the disclosed invention, the effects of shading are excluded for each designated line in line drawings. In particular, by effecting the process one line at a time, it is possible to reduce the volume for the working memory because only one line of line memory is needed as working memory. In addition, because the process is accomplished for each line, it is possible to display a line after processing of that line has been completed while uptaking the image, and to display the next line after processing of that line has been completed. Hence, the disclosed invention offers the advantage of easily coping with continuous input.

According to another embodiment, the disclosed invention is a process that uses a computation to find the brightness values of the pixels to be processed on the basis of the brightness values of the pixels of the pixel positions corresponding to said process line. The process finds the average of the brightness values of the pixel positions corresponding to the previously processed lines and the brightness values of the pixels currently being processed. Accordingly, it is possible to reduce the effects of the brightness of the edge portion using a simple computation.

Another embodiment of the disclosed invention is a process in which the data used to find the n−1 threshold values necessary in converting the image data in each line of the input image data into n values is acquired for each designated line. After the process for a specific line is completed, n−1 threshold values are found and shading correction is accomplished for each designated line on said input image data. The image which has undergone this shading correction then undergoes an n value conversion process using said n−1 threshold values.

This disclosed invention is a combination of a shading correction process and an n value conversion process using n−1 threshold values. This method is effective when it is necessary to reduce the number of gradations while preserving the edges. The method also eliminates the effects of shading in images photographed by an area sensor such as a CCD camera or the like. Furthermore, because the processes are accomplished for each line, it is possible to reduce the volume of the working memory. It is also possible to display a particular line after processing of that line has been completed while uptaking the image and to display the next line after processing of that line has been completed. Hence, the disclosed invention offers the advantage of easily handling continuous input.

In the image processing method of another embodiment of the disclosed invention, the data necessary to determine whether or not the image is a line drawing from the image data in each designated line of the input line data is acquired for each designated line. After the process for a specific line is completed, a determination is made as to whether or not the image is a line drawing. When it is determined that the image is a line drawing, said image data undergoes shading correction.

This embodiment of the invention determines whether or not the image is a line drawing and accomplishes a shading correction if the image is a line drawing. Accordingly, it is possible to: 1) accomplish a shading correction process only on line drawings in which the effects of shading appear; 2) make shading in the line drawing unnoticeable, and; 3) reduce and shorten processing times by accomplishing the correction process only on line drawings. Furthermore, the above described benefits are realized because the processes are accomplished for each line.

In the image processing method of another embodiment of the disclosed invention the data necessary to determine whether or not the image is a line drawing from the image data in each designated line of the input line data is acquired for each designated line. After the process for a specific line is completed, a determination is made as to whether or not the image is a line drawing.

In addition, the data used to find the n−1 threshold values necessary in converting the image data in each designated line of the input image data into n values is acquired for each designated line. After the process for a specific line is completed, n−1 threshold values are found. When it is determined by said line drawing determination that the image is a line drawing, said input image data undergoes shading correction in each designated line. The image which has undergone shading correction undergoes a process of being converted to n values using the n−1 threshold values. When it is determined by said line drawing determination that this image is not a line drawing, a gradation process is accomplished which obtains a two-dimensional gradation, i.e., a halftoning process for example.

The embodiment of the invention as described above determines whether or not the image is a line drawing. If the image is a line drawing, the invention initiates a shading correction and a gradation process using n−1 threshold values. If the image is not a line drawing, the image is deemed to be a natural image and the inventive method initiates a gradation process (e.g., the dither process or error diffusion process) suitable for natural images.

In cases where an image is photographed by an area sensor such as a CCD camera or the like in which shading often occurs when displayed on a reflective LCD or the like, the process is accomplished to reduce gradations. A shading correction is accomplished and an n value conversion process using n−1 threshold values is accomplished for line drawings while a gradation process suitable for natural images is accomplished for natural images. Consequently, it is possible to automatically accomplish a process suitable for the object being photographed regardless of the object being photographed. The above-described benefits are obtained because the processes are for each line.

In another embodiment of the invention, the shading correction process determines for each designated line of input image data, whether or not the pixels comprising that designated line are pixels comprising the edge portion of a line drawing. When these pixels are not pixels comprising the edge, the brightness values of the pixels being processed is found using a computation on the basis of the brightness values of the corresponding pixel positions of the lines processed prior to this. The brightness values processed prior to this are updated by these brightness value that are found. When the pixels comprise the edge, a process that maintains without change the brightness values of corresponding pixel positions of the lines previously processed is repeatedly conducted for each pixel comprising that designated line one designated line at a time.

Accordingly, a background predicting process is accomplished which finds the brightness values of each pixel for each designated line excluding the effects of the brightness of the edge portions in the line drawing. When the brightness value for each pixel in the designated line obtained in this background predicting process is determined to be the desired brightness value or less, a designated search range is set which includes the pixels having this brightness value. The change in brightness from the adjacent pixels within this search range is found for each pixel and when the number of pixels in which there is little change in brightness within the search range is not less than a preset number, the brightness value is determined on the basis of the brightness value of the pixels with little change in brightness. When the number of pixels with little change in brightness in the search range is smaller than a preset number, the brightness value is determined on the basis of the brightness values of the pixels over the entire search range. The modifying process for the background prediction results is accomplished using these determined values.

The results of modifying the background prediction results using the modifying process and the brightness value set as the desired value are compared. The difference between these is found, and a background correction to achieve the desired brightness value is accomplished by adding the difference that is found to the brightness values of the pixel positions corresponding to said input image data.

The disclosed process uses a computation to find the brightness values of the pixels to be processed on the basis of the brightness values of the pixels of the corresponding pixel positions in said processed line. This process finds the average of the brightness values of the corresponding pixel positions of that previously processed line and the brightness values of the pixels being processed.

By accomplishing the shading correction through this method, it is possible to exclude with certainty the effects of shading for each line in line drawings. The method is effective for line drawings such as characters or diagrams where the effect of shading is great. By accomplishing the processes one line at a time it is possible to reduce the volume of the working memory because one line worth of line memory suffices as the working memory. In addition, because the processes are accomplished one line at a time, it is possible to display one line when processing of that line is completed and to display the next line when processing of that line is completed while simultaneously uptaking the image. Thus, the disclosed process easily handles continuous input.

The process includes finding, through computation, the brightness values of the pixels being processed on the basis of the brightness values of the pixels in the corresponding pixel positions on the processed line. The average of the brightness values of the corresponding pixel positions on the previously processed line and the brightness values of the pixels currently being processed are also found. Consequently, it is possible to reduce the effects of the brightness of the edge portions through a simple computation.

The image processing apparatus comprises an image data line memory that stores the data of designated lines of input image data. A background predicting means determines whether or not the respective pixels comprising the image data of the designated lines stored in this image data line memory are pixels comprising the edge portions of the line drawing. The background predicting means accomplishes a background prediction by finding the brightness value of each pixel excluding the effects of the brightness of the edge portions in the line drawing.

A background prediction line memory stores the brightness value of each pixel in the lines being processed and obtained by the background predicting means. Background prediction modifying means determines whether or not the effects of the line drawing other than the edge portion is included in the brightness value of each pixel for which the background is predicted in the lines being processed.

When the effects of the line drawing other than the edge portion are included, the background prediction modifying means finds the brightness value of each pixel excluding this effect and updates the brightness values of the pixels at corresponding positions of said background prediction line memory to this value that has been found.

Background correcting means is also provided for correcting the brightness so that the content of said image data line memory achieve the desired brightness on the basis of the content of the results stored by the background prediction line memory after modification by the background prediction modifying means.

According to another embodiment of the invention, an apparatus comprises an image data line memory that stores the data of designated lines of input image data. Background predicting means make a determination for each designated line of input image data as to whether or not the pixels that comprise that designated line are pixels that comprise the edge portion of a line drawing. When the pixels do not comprise the edge, the background predicting means finds the brightness values of the pixels being processed using a computation on the basis of the brightness values of the pixel positions corresponding to the line previously processed, and updates the brightness values that were previously processed using these brightness values which are found.

When the pixels comprise the edge, the background predicting means repeatedly executes a process which maintains without change the brightness values of the pixel positions corresponding to the line previously processed for each pixel comprising that designated line one designated line at a time.

The apparatus accomplishes a background predicting process which finds for each designated line the brightness value of each pixel excluding the effects of the brightness of the edge portions in the line drawing. A background prediction line memory stores the brightness value of each pixel in the lines being processed obtained by this background predicting means. When the brightness value for each pixel position in the line being processed is determined to be the desired brightness value or less on the basis of the contents of the background prediction line memory obtained in this background predicting process, the background prediction modifying means sets a designated search range which includes the pixels having this brightness value, and finds the change in brightness from the adjacent pixels within this search range for each pixel.

When the number of pixels in which there is little change in brightness within the search range is not less than a preset number, the background prediction modifying means determines the brightness value on the basis of the brightness value of the pixels with little change in brightness.

When the number of pixels with little change in brightness in the search range is smaller than a preset number, the background prediction modifying means determines the brightness value on the basis of the brightness values of the pixels over the entire search range, and accomplishes the modification of the background prediction results by updating the contents of the corresponding pixel positions of said background prediction line memory to the contents which are determined.

Background correcting means compares and finds the difference between the results modified by said background prediction result modification means and the brightness value set as the desired value. The background correcting means modifies the brightness to the desired brightness by adding the difference that is found to the brightness value of the corresponding pixel position of image data line memory.

Thus, with the disclosed invention, the effects of shading are excluded for each designated line in line drawings. In particular, by accomplishing processes one line at a time, it is possible to reduce the volume for the working memory because only one line of image data line memory and background prediction line memory are needed as working memory. Accordingly, the apparatus can be made more compact and lighter in weight, and costs can be reduced. In addition, because the processes are accomplished for each line, it is possible to display a line after processing of that line has been completed while simultaneously uptaking the image, and to display the next line after processing of that line has been completed. Accordingly, the disclosed invention easily copes with continuous input.

In another embodiment of the invention, the process uses a computation to find the brightness values of the pixels to be processed on the basis of the brightness values of the pixels of the pixel positions corresponding to said process line. The process finds the average of the brightness values for the pixel positions corresponding to the lines previously processed and the brightness values for the pixels currently being processed. Accordingly, it is possible to reduce the effects of the brightness of the edge portions through a simple computation.

In addition, the image processing apparatus of the disclosed invention comprises an image data line memory that stores the data of designated lines of input image data. A shading correction means accomplishes shading correction of the image data for each designated line on the basis of the image data stored in the image data line memory. A threshold value computation means acquires the data used to find the n−1 threshold values necessary in accomplishing n value conversion from the image data stored in said image data line memory. After the process for a specific line is completed, the threshold value computation means finds n−1 threshold values. An n value conversion process means performs an n value conversion process on the image that has undergone shading correction by said shading correction means, using said n−1 threshold values.

The invention is a combination of a shading correction means, a threshold computation means that obtains n−1 threshold values, and an n value conversion process means. The apparatus is effective when it is necessary to reduce the number of gradations while preserving the edges and eliminating the effects of shading in images photographed by an area sensor such as a CCD camera or the like. Furthermore, because the processes are accomplished for each line, it is possible to reduce the volume of the working memory. It is also possible to display a line after processing of that line has been completed while simultaneously uptaking the image. The next line can be displayed after processing of a line has been completed. Hence this invention offers the advantage of easily coping with continuous input.

In accordance with another embodiment of the invention, the image processing apparatus of the disclosed invention comprises an image data line memory that stores the data of designated lines of input image data. A line drawing determination means acquires the data necessary to determine whether or not the image data is a line drawing. The necessary data is acquired from each designated line on the basis of the image data stored in the image data line memory. After the process for a specific line is completed, the line drawing determination means determines whether or not the image data is a line drawing. A shading correction means accomplishes shading correction of the image data for each designated line on the basis of the image data stored in this image data line memory. Switching means which, upon receiving an indication from said line drawing determination means that the image includes a line drawing, provides the contents of said image data line memory to the shading correction means.

The disclosed invention determines whether or not an image is a line drawing and accomplishes a shading correction if the image is a line drawing. Through this, it is possible to accomplish a shading correction process only on line drawings in which the effects of shading most often appear. The disclosed invention makes shading in the line drawing unnoticeable and reduces and shortens processing times by accomplishing the correction process only on line drawings. Because the processes are accomplished for each line, the above-described benefits are obtained.

In another embodiment of the invention, the image processing apparatus comprises an image data line memory that stores the data of designated lines of input image data. A line drawing determination means acquires the data necessary to determine whether or not the image data is a line drawing in each designated line on the basis of the image data stored in the image data line memory. After the process for a specific line is completed, the line drawing determination means determines whether or not the image data is a line drawing. A threshold value computation means acquires the data used to find n−1 threshold values necessary to accomplish n value conversion from the image data stored in said image data line memory. After the process for a specific line is completed, the threshold value computation means finds n−1 threshold values.

Shading correction means accomplishes shading correction of the image data for each designated line on the basis of the image data stored in the image data line memory. An n value conversion process means performs an n value conversion process on the image that has undergone shading correction by said shading correction means, using said n−1 threshold values. A natural image gradation process means accomplishes a two-dimensional gradation process, i.e., a halftoning process for example, on images other than line drawings. Selection means selects the natural image gradation process means or a line drawing gradation process means (comprising said threshold value computation means, shading correction means and n value conversion process means) in accordance with whether the image is a line drawing or not as determined by the line drawing determination.

When the image is a line drawing, a gradation process including shading correction is accomplished by the line drawing gradation process means. When the image is not a line drawing, a gradation process is accomplished by the natural image gradation process means.

The above disclosed embodiment of the invention determines whether or not an image includes a line drawing. If the image is a line drawing, a shading correction process and a gradation process using n−1 threshold values are initiated. If the image is not a line drawing, the image is deemed to be a natural image and a gradation process suitable for natural images is initiated (e.g., the dither process or error diffusion process).

The disclosed invention is particularly effective in cases where an image photographed by an area sensor (such as a CCD camera or the like in which shading often occurs) is displayed on a reflective LCD or the like. When a process is initiated to reduce gradations, a shading correction and an n value conversion process using n−1 threshold values are accomplished for line drawings, while a gradation process suitable for natural images is accomplished for natural images. Consequently, it is possible to automatically accomplish a process suitable for the object being photographed regardless of the object being photographed. Furthermore, because the processes are for each line, the above-described benefits are obtained.

In the disclosed invention of any of claims 12–14, the shading correcting means comprises a number of elements. In particular, an image data line memory stores the data of designated lines of input image data. Background predicting means determines whether or not the pixels comprising that designated line are pixels comprising the edge portion of a line drawing for each designated line of image data stored in the image data line memory. When the pixels are not pixels comprising the edge, the background prediction means finds the brightness values of the pixels being processed using a computation on the basis of the brightness values of the corresponding pixel positions of the lines previously processed, and updates the brightness values previously processed by the brightness value that are found. When the pixels comprise the edge, the background predicting means repeatedly conducts a process that maintains without change the brightness values of the corresponding pixel positions of the lines previously processed for each pixel comprising that designated line one designated line at a time. The background predicting means then finds for each line the brightness values of each pixel excluding the effects of the brightness of the edge portions in the line drawing.

A background prediction line memory stores the brightness value of each pixel obtained by the background predicting means. When the brightness value for each pixel position in the line being processed is determined to be the desired brightness value or less on the basis of the contents of the background prediction line memory obtained in said background predicting process, background prediction modifying means sets a designated search range which includes the pixels having this brightness value, finds the change in brightness from the adjacent pixels within this search range for each pixel. When the number of pixels in which there is little change in brightness within the search range is not less than a preset number, the background prediction modifying means determines the brightness value on the basis of the brightness value of the pixels with little change in brightness. Finally, when the number of pixels with little change in brightness in the search range is smaller than a preset number, the background prediction modifying means determines the brightness value on the basis of the brightness values of the pixels over the entire search range, and accomplishes modification of the background prediction results by updating the contents of the corresponding pixel positions in said background prediction line memory to said determined contents.

Background correcting means compares and finds the difference between the results of modification by said background prediction results modification means and the brightness value set as the desired value. The background correcting means then corrects the brightness to the desired brightness value by adding the difference that is found to the brightness values of the corresponding pixel positions of said image data line memory.

The disclosed process uses a computation to find the brightness values of the pixels to be processed on the basis of the brightness values of the pixels of corresponding pixel positions in said processed line. The process also finds the average of the brightness values of the corresponding pixel positions of the previously processed line and the brightness values of the pixels being processed.

By accomplishing the shading correction through this kind of apparatus, it is possible to exclude with certainty the effects of shading for each line in line drawings, making it possible to obtain a good image. In particular, by accomplishing the processes one line at a time it is possible to reduce the volume of the working memory because one line worth of image data line memory and background prediction line memory suffices as the working memory. It is also possible to make the apparatus more compact and lighter in weight while reducing costs. In addition, because the processes are accomplished one line at a time, it is possible to display one line when processing of that line is completed and to display the next line when processing of that line is completed while simultaneously uptaking the image, thereby easily handling continuous input.

The disclosed process includes finding, through computation, the brightness values of the pixels being processed on the basis of the brightness values of the pixels in corresponding pixel positions on a processed line. The process further includes finding the average of the brightness values of the corresponding pixel positions on the previously processed line and the brightness values of the pixels currently being processed. Consequently, it is possible to reduce the effects of the brightness of the edge portions through a simple computation.

BRIEF DESCRIPTION OF THE DRAWINGS

These and other aspects and advantages of the invention will become apparent from the following detailed description of preferred embodiments when taken in conjunction with the accompanying drawings, in which.

DETAILED DESCRIPTION OF PREFERRED EMBODIMENTS

Figure 1:
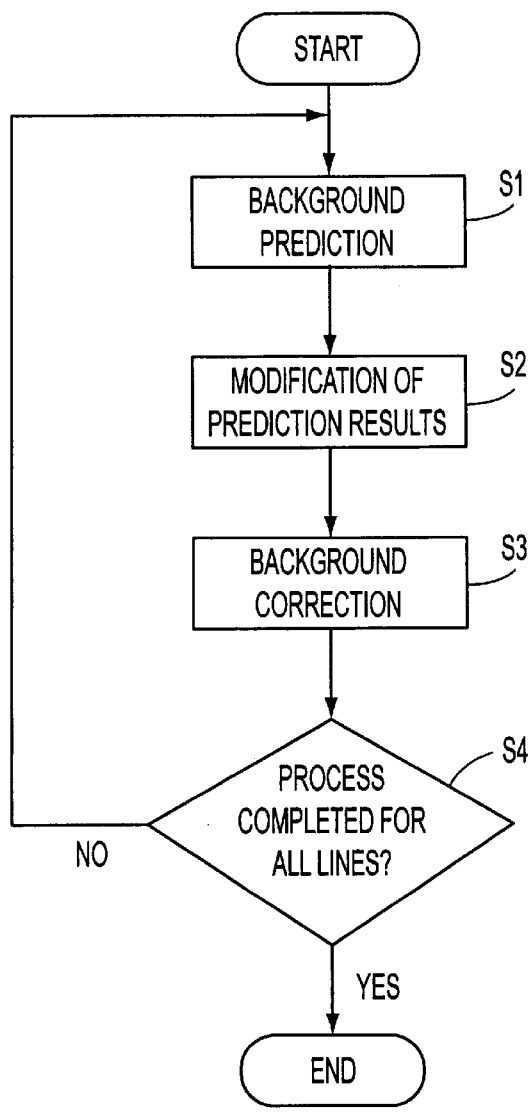
FIG. 1 is a flowchart describing the overall process of an embodiment of the invention.

While the invention will hereinafter be described in connection with preferred embodiments thereof, it will be understood that it is not intended to limit the invention to those embodiments. On the contrary, it is intended to cover all alternatives, modifications and equivalents that may be included within the spirit and scope of the invention as defined by the appended claims.

For a general understanding of the features of the invention, reference is made to the drawings. In the drawings, like reference numerals have been used throughout to designate identical elements.

Hereafter, the configuration of the preferred embodiments of the present invention will be described with reference to the drawings.

In a preferred embodiment, the photographed image will be assumed to be an image such that a line drawing, (characters or a diagram) is drawn on a background of substantially uniform color. This image will be assumed to receive the effects of shading. FIG. 1 is a flowchart describing the comprehensive summary process of the preferred embodiment, and hereafter the process sequence will be described.

First, the summary process will be explained, with the individual detailed processes explained afterward.

In FIG. 1, a background prediction is accomplished in order to predict the background for one line of data of the image data uptaken by the CCD camera (step s1) Then, modification of the prediction results is accomplished using the results of this background prediction (step s2), and background correction is accomplished by making reference to the modification data of the prediction results (step s3). Following this, a determination is made as to whether or not processing of all lines of one screen has been completed (step s4), and if this has not been completed, the processes from step s1 on are accomplished for the next line.

The aforementioned background predicting process is accomplished as follows.

Figure 2:
FIG. 2 is a drawing showing one example of an image used to explain the preferred embodiment of the invention.

FIG. 2 is a drawing showing an example of an image uptaken by the CCD camera, wherein a line drawing 20 including characters exists on a bright background 10 of uniform color. The periphery of the image is darker than the central portion due to the effects of shading, although this is not represented in FIG. 2.

Figure 3A:
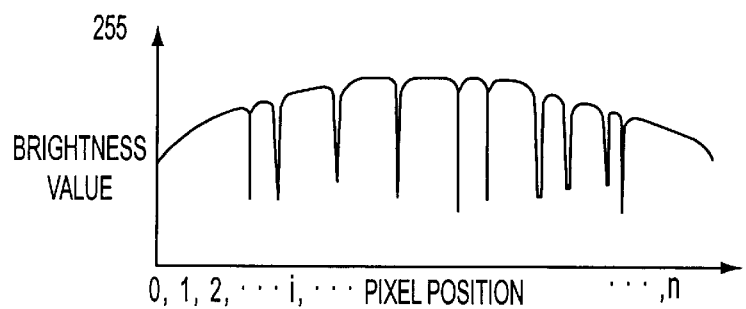
FIGS. 3($a$)–3($d$) are drawings showing the relationship between the brightness value and the pixels in the preferred embodiment of the invention.

FIG. 3a shows the relationship of the brightness value (assumed to take on values in the brightness range of 0 to 255) to the pixels (expressed by the respective pixel numbers "0, 1, 2, . . . , i, . . . , n") in one particular line (e.g., the one line indicated by the dashed line in FIG. 2) of an image such as the one shown in FIG. 2. The areas where the brightness value drops suddenly indicates that the pixels comprise characters, with the remainder indicating that the pixels comprise the background. The brightness of the character area on the one line indicated by the dashed line in FIG. 2 and the change in the brightness in FIG. 3 do not necessarily match. In addition, this image includes shading effects. Consequently, the brightness change curve of the background area shows higher brightness near the center of the image and shows lower brightness toward the two edges.

The effects of shading will be eliminated for this kind of background, but first a process is accomplished which smooths the brightness change of the background area by substantially eliminating the effects of the characters. This will be called the background predicting process and will be described with reference to the flowchart in FIG. 4.

Figure 4:
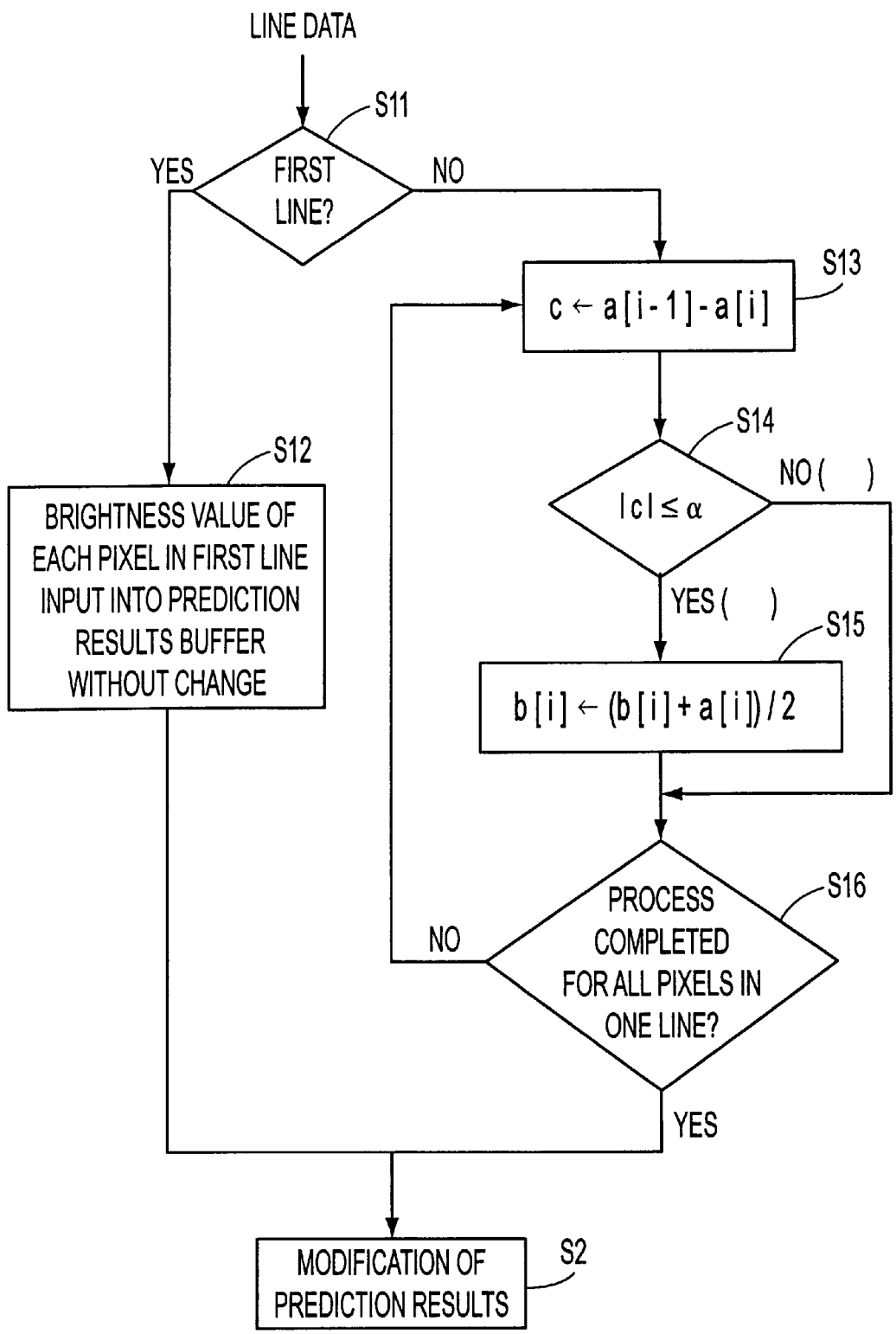
FIG. 4 is a flowchart explaining the background predicting process in the preferred embodiment of the invention.

In FIG. 4, a determination is first made as to whether or not the line to be processed is the first line (step s11). When the line is determined to be the first line, the brightness of each pixel comprising the first line is stored in a prediction results buffer in correspondence to the pixels (step s12). When the line to be processed is not the first line, the flowchart moves to the processes from step s13 on.

In step s13, a process is performed which subtracts the brightness value a[i] of the pixel being processed in said line from the brightness value a[i−1] of the pixel immediately prior to the pixel being processed, and calls this difference C. Next, the absolute value of the value C found in step s13 is compared to a preset constant α (step s14), and a determination is made as to whether said pixel is a pixel in the edge portion of the character or is a pixel other than this. Moreover, when the brightness range of the uptaken image data is 0 to 255, and α is set to 10, if $|C| \leq \alpha$, this pixel is determined to be a pixel comprising the background area. if $|C| \leq \alpha$ is not true, the pixel is deemed to be a pixel of the edge portion of the character. The value of a is not restricted to 10, but can be set to the optimum value depending on various conditions.

When it is determined through this process that the pixel being processed is a background pixel, the contents of the prediction results buffer corresponding to the pixel being processed is updated. That is to say, using the contents of the prediction results buffer, the brightness value of the pixel being processed is added to the brightness value of the pixel corresponding to the position of the pixel being processed. This value is then divided by 2 (the average is found) and the result of this computation is stored in the corresponding pixel position of the prediction results buffer (step s15). This process will now be explained more concretely.

Assuming that the numbers of the pixels of one line are expressed as 1, 2, . . . , 1, . . . , n, the brightness values b[1], b[2], . . . , b[i], . . . , b[n] corresponding to each pixel in the line are stored in the prediction results buffer. Furthermore, assuming that the pixel currently being processed is the ith pixel in a particular line, the average of the brightness value a[i] of the pixel being processed and the brightness value b[i] of the ith pixel of the previous line already stored in the prediction results buffer is found. This value becomes b[i] of the prediction results buffer as new data. Because there are typically no sudden changes in the brightness of the background, a background prediction strong against noise is obtained by taking the average.

A determination is then made as to whether or not the processes have been completed for all pixels in the one line currently being processed (step s16). If the processes have not been completed, the process in step s13 is conducted for the next pixel in that line. If $|C| \leq \alpha$ in step s14, this pixel is determined to be a pixel comprising the background area, and the processes in steps s15 and s16 are then performed. Accordingly, the average of the brightness value of the pixel currently being processed and the brightness value of the pixel in the same position on the previous line is stored for each pixel in their respective positions in the prediction results buffer.

When the processes have been completed for all pixels on the line, the flowchart next moves to the process of modifying the prediction results. This process will be described in detail hereafter.

The process is accomplished such that when the respective pixels in the line being processed are deemed to be background, the average of the brightness value of the pixel currently being processed and the computation results to that point (the average value of the brightness values of the respective pixels in the corresponding position in the processed lines) is found using the computation results, and is stored in the prediction results buffer as new data. When the pixel in the corresponding position in the next line is deemed to be background, the average of the brightness value of the pixel currently being processed and the computation results to that point (the average value of the brightness values of the pixels in the corresponding position) is found using the computation results, and is stored in the prediction results buffer as new data.

When $|C| \leq \alpha$ is determined to not be true in step s14, or when it is determined that the pixel being processed is a pixel comprising an edge portion, no process is performed that would take into consideration the elimination of the effects of the edge portions comprising characters or the like and the fact that the change in brightness of the background is smooth. Accordingly, the value of the prediction results buffer is not altered, and the brightness value of the position corresponding to this pixel is maintained without change as the data found up to the previous line.

Figure 3B:
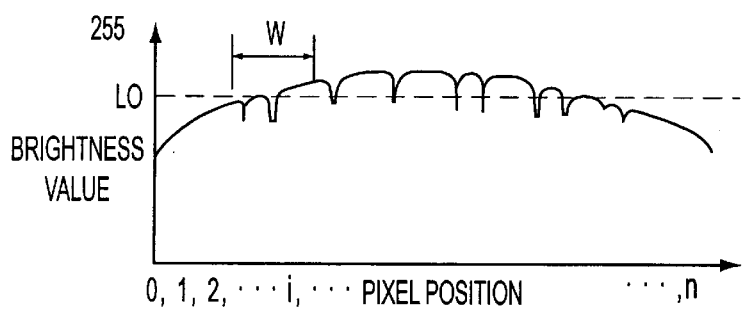

FIG. 3b is a curve showing the change in brightness for the respective pixels in a particular line (the same line as in FIG. 3a) after the above-described background predicting process has been performed. As can be understood from FIG. 3b, the prediction of the brightness of the background area through the effects of shading is to a certain degree smoother than that in FIG. 3a. In FIG. 3b, L0 indicates the desired brightness value when the effects of shading are eliminated and the brightness is made to be a particular fixed brightness value.

In addition, FIG. 3b still shows areas of sudden drops in brightness. These are created by the effects of using the data of characters other than the edge portions in the background predicting process.

In step s14 in the flowchart in FIG. 4, the pixel was background if $|C| \leq \alpha$ (and was edge if $|C| \leq \alpha$ was not true.

But, in actuality the characters have a specific width, and in the case of pixels comprising a portion of a line having width, the relation |C|≦α is established between this pixel and the adjacent pixel. The data of this line area is used and the process in step s15 is performed. Accordingly, the areas where the brightness drops suddenly in FIG. 3b are created because the effects of the characters still slightly remain. The prediction results modifying process modifies this by using the data of the prediction results buffer to accomplish a modifying process on the prediction results (step s2). This modifying process using the prediction results modifies the background, and particularly the parts where the effects of characters remain, and obtains a brightness curve for the background alone. Hereafter this modifying process on the prediction results will be described with reference to the flowchart in FIG. 5.

Figure 5:
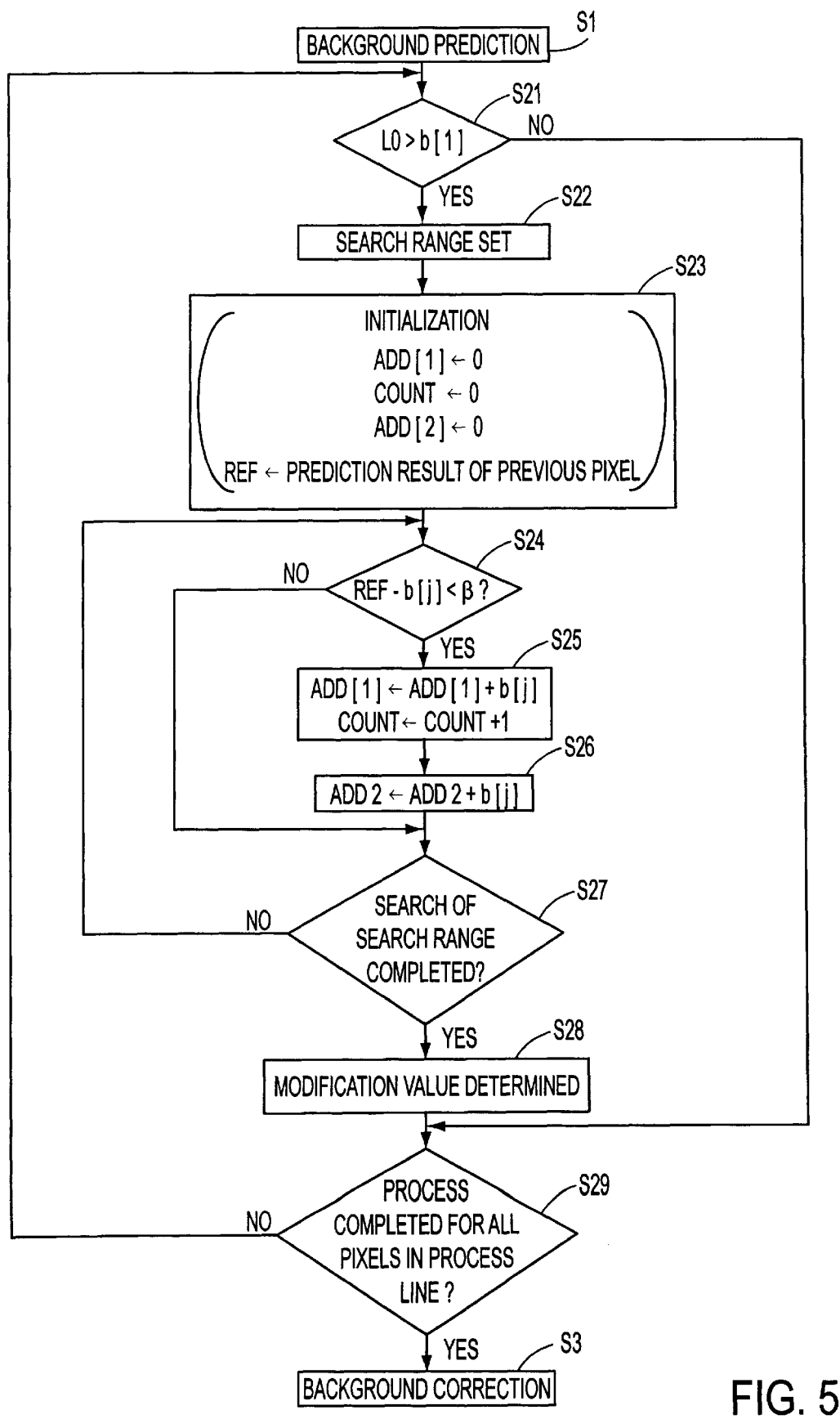
FIG. 5 is a flowchart explaining the background prediction modifying process in the preferred embodiment of the invention.

In FIG. 5, the desired brightness L0 and the brightness b[i] of one pixel in the line being processed are compared (step s21). If L0>b[i], i.e., when the brightness of a certain pixel in the prediction results buffer is smaller than the desired brightness L0, this pixel is deemed to be one in which the brightness has dropped due to the effects of the characters remaining and a modifying process is performed. This modifying process is performed in accordance with the sequence from step s22 on.

At step S22 the search range is set. The setting of this search range is accomplished by making the search range about ⅒ of the width of one line in the image, centered about the pixel being processed. The pixels in this range are set as the search range pixels. For example, in FIG. 3b, when the pixel at position i is determined to be such that L0>b[i], the search range w is set as shown in the figure, centered about that pixel.

When the setting of the search range is accomplished in this manner, initialization is then accomplished (step s23). This initialization sets add[1] to 0, "count" to 0, add[2] to 0 and "ref" to the prediction results of the immediately prior pixel. This process will be described in greater detail in the explanation of the processes in steps s24, s25 and s26 in order to make the explanation easier to understand.

In step s24, a determination is made as to whether or not a value found by subtracting the prediction result b[j] of a particular pixel in the search range from "ref" is smaller than a preset constant β. That is to say, a determination is made as to whether or not "ref−b[j]<β". Here, j is a variable indicating a position in the search range set in step s22. In addition, β is set to around β=20 when the brightness range of the image is 0 to 255. This value β is not restricted to this value, but may be set to an optimum value depending on various conditions.

When ref−b[j]<β, the difference between the prediction result of the pixel being processed and the prediction result of the immediately previous pixel is relatively small. Consequently, it is determined that this prediction result of the pixel being processed is a good value and the change in brightness is smooth. When it is determined that the prediction result of the pixel being processed is good, this prediction result of the pixel being processed is added anew to add[1] at that point, and this is set as add[1]. Furthermore, the number of pixels determined to be good is added to the "count" at this point (step s25).

Accordingly, add[1] is a value obtained by adding the prediction results of the pixels having good prediction results in the search range, and "count" is a value expressing the number of such pixels. Hence, if the pixel being processed is the first pixel in the search range, add[1] has the initial value of "0" and "count" also has the initial value "0". Consequently, after the process has been performed for this first pixel, the value of add[1] is exactly the prediction result of this pixel and "count" is "1".

Next, in step s26, the prediction result of this pixel being processed is added to add[2] at this point and this is set as add[2]. For example, if the prediction result of the pixel being processed is b[j], the result of add[2]+b[j] is set as the new add[2]. This add[2] is a value obtained by adding the prediction results of the pixels over the entire search range regardless of whether the result is a good prediction result or a poor prediction result. For example, if the pixel being processed is the first pixel in the search range, add[2] has an initial value of "0". Consequently, after processing the first pixel, the value of add[2] is exactly the prediction result of this pixel.

However, when ref−b[j]<β is not true in the above-described step s24, the difference between the prediction result of the pixel being processed and the prediction result of the immediately prior pixel is large. Consequently, the prediction result of this pixel being processed is determined to be a poor value, that is to say, this is a pixel in which the effects of characters other than the background remain. Thus, when the prediction result of the pixel being processed is determined to be poor, the process in step s26 is performed directly, and the prediction result of this pixel being processed is added to the add[2] value at that point and set as add[2]. Thus, add[2] becomes the value obtained by adding the prediction results of the pixels over the entire search range regardless of whether the result is a good prediction result or a poor prediction result.

Next, a determination is made as to whether or not the processes have been completed for all pixels in the search range (step s27). If the processes have not been completed, the processes in steps s24, s25 and s26 are performed for the next pixel in said search range.

When the processes have been completed for all pixels in the search range, a modification value determining process is performed (step s28). This modification value determining process is performed as follows.

First, after the processes (steps s24–s26) have been completed for each pixel in one search range, a determination is made as to what the number of "count" is, i.e.—how many pixels have a prediction result that is good. When this number reaches at least a specific value, the value of add[1] (this value is the total value of the prediction results that are good) is divided by the number of "count" to find the average prediction result. Then, the average prediction result found in this manner is set as the modified brightness value of the prediction results for the pixels such that L0>b[i] (step s21). The reason a specific value is used here is that the modification of the prediction results in step s2 accomplishes modification on the basis of the statistical amount. When the sample size is small, this value is not suitable as the statistical amount.

On the other hand, when the number of pixels having a prediction result that has been determined to be good has not reached at least the specific constant, i.e.—when the number of pixels having a prediction result that has been determined to be good is small, the prediction result total value add[2] in the search range found in step s26 is divided by the number of pixels in the entire search range to find the average prediction result in the search range. This average prediction result in the search range is set as the modified brightness value of the prediction results corresponding to the pixels such that L0>b[i] (step s21).

Thus, when the number of pixels determined to be good in the set search range is a specific number or greater, a process is performed which modifies the brightness value of the pixel being processed using the prediction result that is the average of the total value of the prediction results that are determined to be good. When the number of pixels having prediction results that are determined to be good is small, a process is performed to find the prediction value that is the average of the prediction result total value in the entire search range. The process then modifies the brightness value of the pixel being processed using the prediction result that is the average over the entire search range.

Thus, when the processes are completed for a particular pixel, a determination is next made as to whether or not the processes have been completed for all pixels on the line currently being processed (step s29). If these processes have not been completed, the process returns to step s21 and the processes from step s21 on are again performed.

Figure 3C:
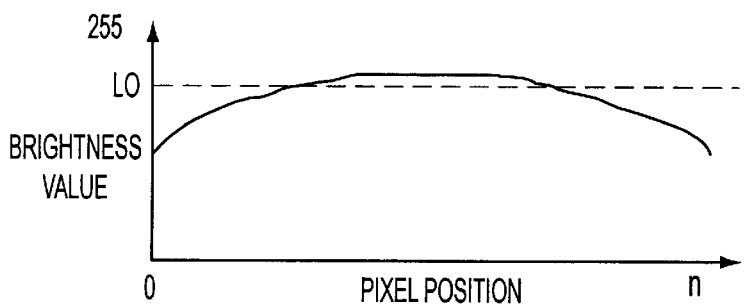

FIG. 3c is a drawing showing the prediction results for the background area from which the effects of the characters have been substantially removed, after the above-described modifying process for the prediction results has been completed.

Next, a background correcting process is accomplished (step s3) which sets a specific brightness value excluding the effects of shading, using the prediction result for the background.

This background correcting process is a process that sets the brightness value for the respective pixels in the line being processed to a certain desired fixed brightness value L0 in the brightness curve shown in FIG. 3c. This background correcting process acts on the line being processed on which the prediction result modifying process has been performed and, for example, finds for each pixel the difference between the certain fixed brightness value L0 and the brightness curve for which the prediction results have been modified, and adds or subtracts the appropriate value to the brightness of each pixel in the line being processed so that this difference becomes 0. Accordingly, the brightness of the background becomes the certain fixed brightness value LO, the brightness is fixed, and the effects of shading are eliminated.

Figure 3D:
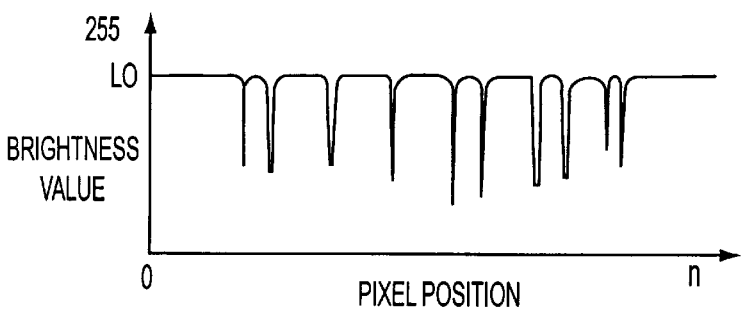

Finally the brightness distribution containing the character portions in the line being processed are shown in FIG. 3d. After the above processes have been performed for all lines, the image shows the screen as a background of substantially uniform brightness with the effects of shading removed.

Figure 6:
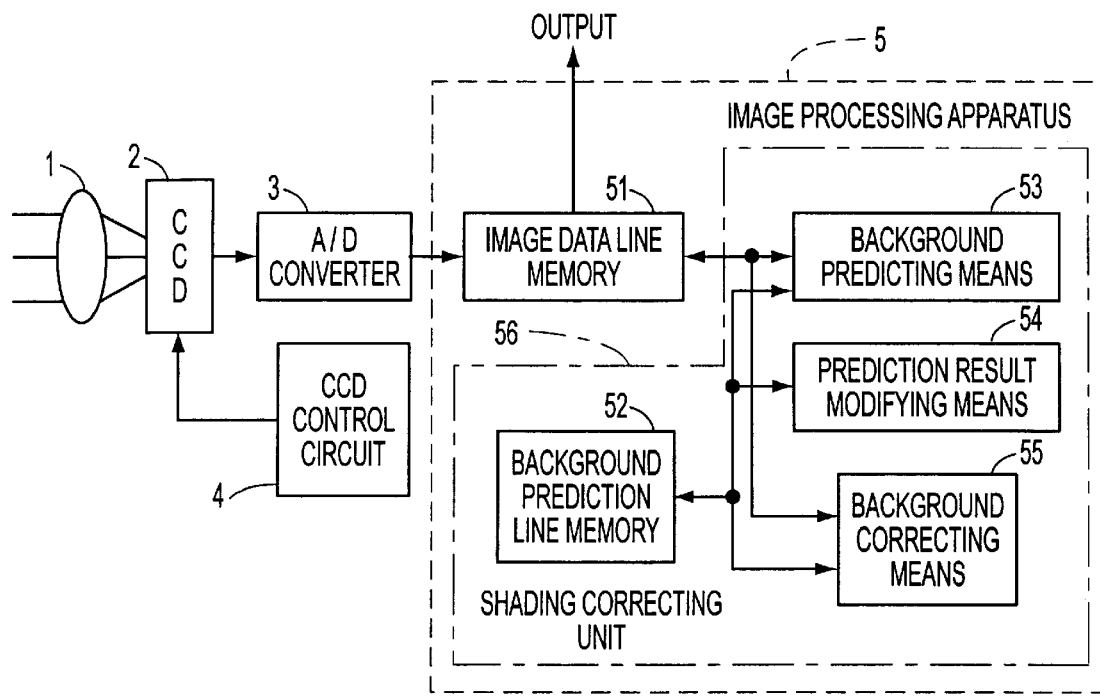
FIG. 6 is a drawing showing an apparatus in which a CCD camera is combined with an image processing apparatus in the preferred embodiment of the invention.

FIG. 6 is a drawing showing an example of an apparatus used to realize this embodiment of the invention. The apparatus comprises a lens 1, a CCD camera 2, an A/D converter 3, a CCD control circuit 4, and an image processing apparatus 5.

The image processing apparatus 5 accomplishes the above-described processes, and has: an image data line memory 51; a background prediction line memory 52; a background predicting means 53; a background result modifying means 54; and a background correcting means 55. A shading correcting unit 56 comprises the background prediction line memory 52, background predicting means 53, background result modifying means 54 and background correcting means 55.

The aforementioned image data line memory 51 stores one line worth of image data uptaken by the CCD camera 2 and which has undergone A/D conversion. Furthermore, the background predicting means 53 accomplishes a background predicting process such as the one explained in the flowchart in the above-described FIG. 4 using the one line of image data stored in the image data line memory 51. The background prediction line memory 52 is used as the working memory when this background prediction is accomplished. This background prediction line memory 52 corresponds to the prediction results buffer in FIG. 4, and the prediction results for each pixel in said line are stored corresponding to the respective pixels when the processes have been completed for all pixels in one line.

Prediction result modifying means 54 accomplishes the background result modifying process as explained in the flowchart in FIG. 5. The prediction result modifying means 54 accomplishes the modifying process following the process sequence in FIG. 5 using the contents of the background prediction line memory 52. Furthermore, this means updates the data in the background prediction line memory 52 to the post-modification data.

Background correcting means 55 accomplishes the process in step s3 in the flowchart in FIG. 1, and accomplishes background correction of the contents of the image data line memory 51 using the data in the background prediction line memory 52 where the post- modification data is stored. An image such as the one shown in FIG. 3d ultimately results.

The above process is performed on each line, and a continuous process for each line is performed such that while the uptaking of an image is being accomplished, one line is displayed as processing of that line is completed, and the next line is then displayed as processing of that line is completed.

As described above, the first embodiment accomplishes prediction of a background area where there are no effects from the line drawing portion. Because prediction of the background area is accomplished using data found in the previous line, it is possible to make a background image have a smooth change in brightness even though a large change in brightness because of shading exists. Ultimately, it is possible to make a background image with the desired brightness in which the effects of shading have been eliminated.

As can be seen from the composition in FIG. 6, only the line memory is needed as the working memory. Consequently, the memory requires a smaller volume than when a frame memory for one screen is used. In addition, as described above, the process is a process for each line, and hence while the uptaking of an image is being accomplished, one line is displayed as processing of that line is completed. The next line is then displayed as processing of that line is completed. Consequently, it is easy to handle continuous input.

It is also possible to omit the background prediction (step s1) in FIG. 1 and to perform the processes from step s2 on by comparing the input image data to the background prediction result of step s1. In this case, the processing speed becomes faster, but the accuracy of the background prediction found in step s2 drops.

Another embodiment of the invention accomplishes a process that is a combination of the shading correction process described in the previously described embodiment, and a process to decrease gradations.

As noted in the above section on background art, when an image uptaken by a photography means (such as a CCD camera or the like having a large number of gradations) is displayed on a display unit such as a reflective LCD having a small number of gradations, it is necessary to reduce the number of gradations. When these gradations are decreased, if an image in which the periphery is dark due to the above-described effects of shading undergoes, for example, a four gradation conversion process, there are cases where the post-process image appears to be smeared black with dark areas on the periphery. Hence, when accomplishing the process for decreasing gradations, it is necessary to revise the effects of shading for an image that has shading.

With this disclosed embodiment, it is possible to reduce gradations after eliminating the effects caused by shading even for images with shading that are photographed by an area sensor such as a CCD camera or the like.

Figure 7:
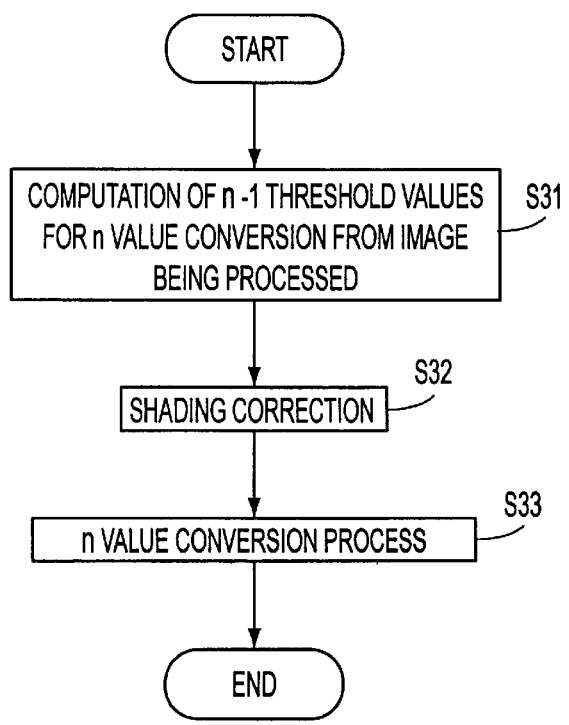
FIG. 7 is a flowchart describing the overall process of another embodiment of the invention.

FIG. 7 is a flowchart explaining the overall sequence of processes in the disclosed embodiment. The first through n−1st threshold values are found in order to convert the image being processed to n values (step s31). FIG. 7 shows a process for finding the first through third threshold values when the image data having 256 gradations ranging from 0 to 255, for example, input by a CCD camera or the like, is converted into image data having four gradations.

Then, a shading correction process (step s32) is accomplished. Following this, an n value conversion process is accomplished using the first through n−1st threshold values (step s33).

The process for finding the n−1 threshold values used in n value conversion in aforementioned step s31 is not particularly limited. If the image being photographed is a line drawing it is possible for example to expand and use the "Ohtsu method".

The "Ohtsu method" is, as explained above, a binarization method suitable for line drawings. But when four value conversion is accomplished using this, it is first necessary to convert to two values and to then convert each of the regions partitioned by this into two values, thereby performing the binarization process three times. Hence, the volume of computations becomes enormous and a long processing time is required.

Figure 8:
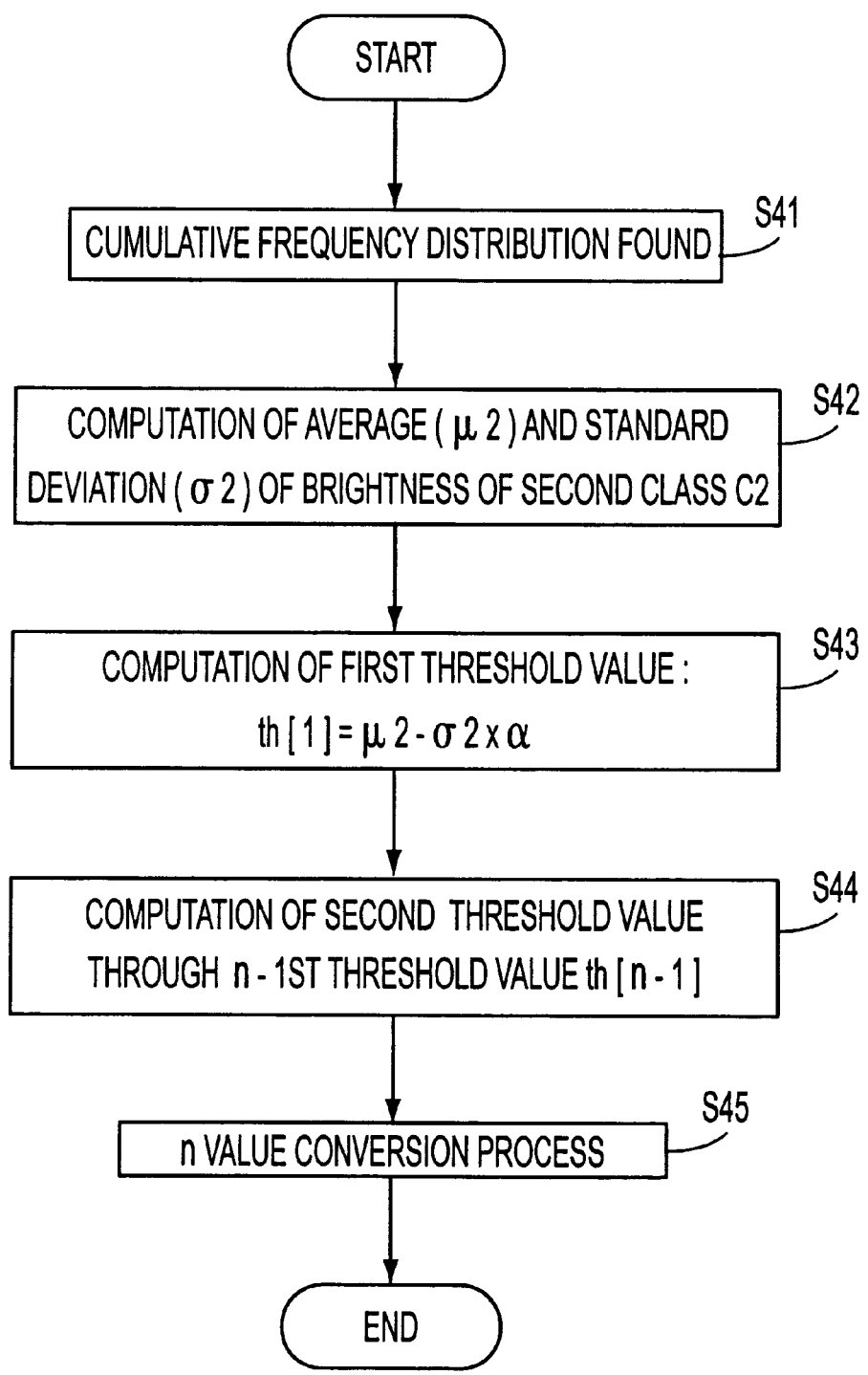
FIG. 8 is a flowchart explaining the sequence of processes for computing the n−1 threshold values in accordance with the embodiment shown in FIG. 7.

Hence, with this disclosed embodiment, a method is employed which finds the n−1 threshold values by adding a slight computation to the "Ohtsu method." This method for finding the n−1 threshold values used in this conversion to n values is described hereafter with reference to the flowchart in FIG. 8.

Figure 9A:
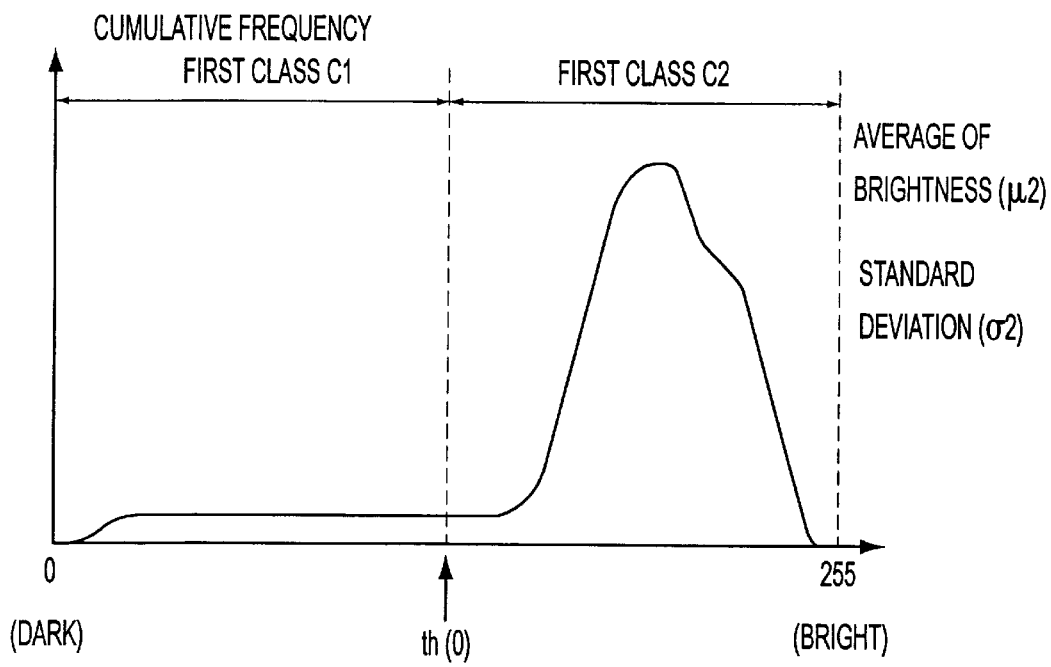
FIGS. 9($a$)–9($b$) are drawings showing the cumulative frequency distribution of pixels for brightness values to explain one example of the n−1 threshold values computation method.

First, the cumulative frequency distribution is found for the image data uptaken by the CCD camera (step s41). An example of the cumulative frequency distribution that is found is shown in FIG. 9a. The image being processed here is, similar to the above, assumed to be an image such that a line drawing is drawn on a bright background occupying the largest portion of the image. Accordingly, the curve of the cumulative frequency for each brightness i (brightness range of 0 to 255) is, as shown in FIG. 9a, a curve in which the cumulative frequency is larger on the side with high brightness. In this case, the brightness range of the CCD camera is assumed to be 256 gradations ranging from 0 to 255.

Furthermore, using this kind of cumulative frequency distribution, the binarization threshold value th[0] is found by the "Ohtsu method". Of the regions partitioned by this binarization threshold value, the low brightness side is called the first class C1 and the high brightness side is called the second class C2. The cumulative frequencies in the first class C1 are primarily from the line drawing, while the cumulative frequencies in the second class C2 are primarily from the background.

Next, the average $\mu 2$ and the standard deviation $\sigma 2$ of the brightness in the second class C2 are computed (step s42). The larger part of this second class C2 is occupied by background, and consequently the average value $\mu 2$ of the brightness in the second class C2 can be thought of as substantially the average value of the brightness of background. Furthermore, the first threshold value th[1] out of the n−1 threshold values used in conversion to n values is found (step s43) using the average $\mu 2$ and the standard deviation $\sigma 2$ of the brightness. This first threshold value th[1] is found from:

$$th[1] = \mu 2 - \sigma 2 \times \alpha \quad (1)$$

In equation (1), $\alpha$ is a coefficient. In experiments, good results were obtained by setting $\alpha = \frac{1}{2}$, which value is intended to be illustrative and not limiting because the optimum value may be set depending on a variety of conditions.

This first threshold value th[1] found from equation (1) essentially shows the boundary between the line drawing and the background. The boundary between the line drawing and the background can be considered to exist on the dark side of the average value $\mu 2$ of the brightness of the background. Accordingly, the first threshold value th[1] may be a value obtained by subtracting a certain value from the average value $\mu 2$ of the brightness of the background.

Figure 9B:
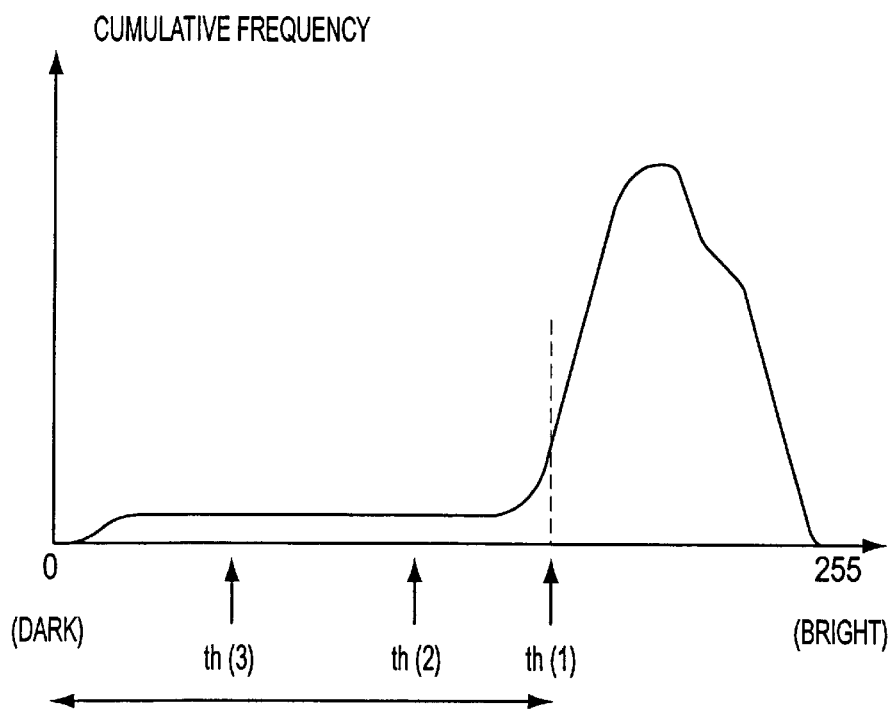

However, even if the color of the background is assumed to be uniform, the cumulative frequency of the brightness of the background has a width that differs depending on the photography state and the device that inputs the image. In particular, in an image with shading photographed by an area sensor such as a CCD camera or the like, the fluctuation in the width of the part corresponding to the background in the cumulative frequency distribution is severe. Hence, in order to absorb the width of the cumulative brightness, the first threshold value th[1] is found by using the standard deviation $\sigma 2$ of the second class C2, which is an indication of width, as a parameter and subtracting from the average value $\mu 2$ of the brightness of the background a value which is this parameter multiplied by a suitable coefficient $\alpha$. The first threshold value th[1] found in this manner is shown in FIG. 9b.

Next, in step s44 of FIG. 8, other threshold values are found based on this first threshold value th[1]. Here, assuming the number of gradations to be found is n, n−1 threshold values are determined. Accordingly, in this step s44, the second threshold value th[2] through the n−1st threshold value th[n−1] are found based on the first threshold value th[1]. The process of finding the second threshold value th[2] through the n−1st threshold value th[n−1] based on the first threshold value th[1] is explained hereafter.

The number of cumulative pixels for each brightness value less than or equal to the first threshold value th[1] are all added together to find the total number of cumulative pixels. This total number of cumulative pixels is divided into n−1 equal parts. In this embodiment, the number of gradations to be found is assumed to be 4 gradations (n=4). Consequently the number of pixels for each brightness less than or equal to the first threshold value th[1] are added and the resulting total number of cumulative pixels is divided into three equal parts to find the second threshold value th[2] and the third threshold value th[3].

For example, suppose that the total number of cumulative pixels obtained by adding together the number of cumulative pixels for each brightness less than or equal to the first threshold value th[1] is 120, the result "40" is obtained by dividing this into three equal parts. Then, a threshold value is set every 40 pixels. That is to say, the number of cumulative pixels for each brightness is added from brightness 0 in the direction of greater brightness, and the location where the total number of pixels reaches 40 pixels is set as a threshold value (the third threshold value th[3]. The number of cumulative pixels for each brightness is then added from this third threshold value in the direction of greater brightness, and the location where the total number of pixels again reaches 40 pixels is set as a threshold value (the second threshold value th[2]). Accordingly, the second and third threshold values th[2] and th[3] are determined and the first through n−1st threshold values are determined.

However, the shading correction process in step s32 of FIG. 7 is a series of processes including the background predicting process, the prediction result modifying process and the background correcting process described in the first embodiment using FIG. 1 through FIG. 6. These process methods are the same as described above, and hence detailed description of these processes is omitted.

In this embodiment, the desired brightness value L0 may be a larger value than the first threshold value th[1] which is set on the side with highest brightness value. Thus, by setting the desired brightness value L0 to a larger value than the first threshold value th[1] which is set on the side with highest brightness value, the image becomes such that the background is brighter and the characters or the like are easier to see after the n value conversion process. As an example, the case where this is the average value $\mu 2$ of the brightness in the above-described second class C2 can be considered.

Figure 10:
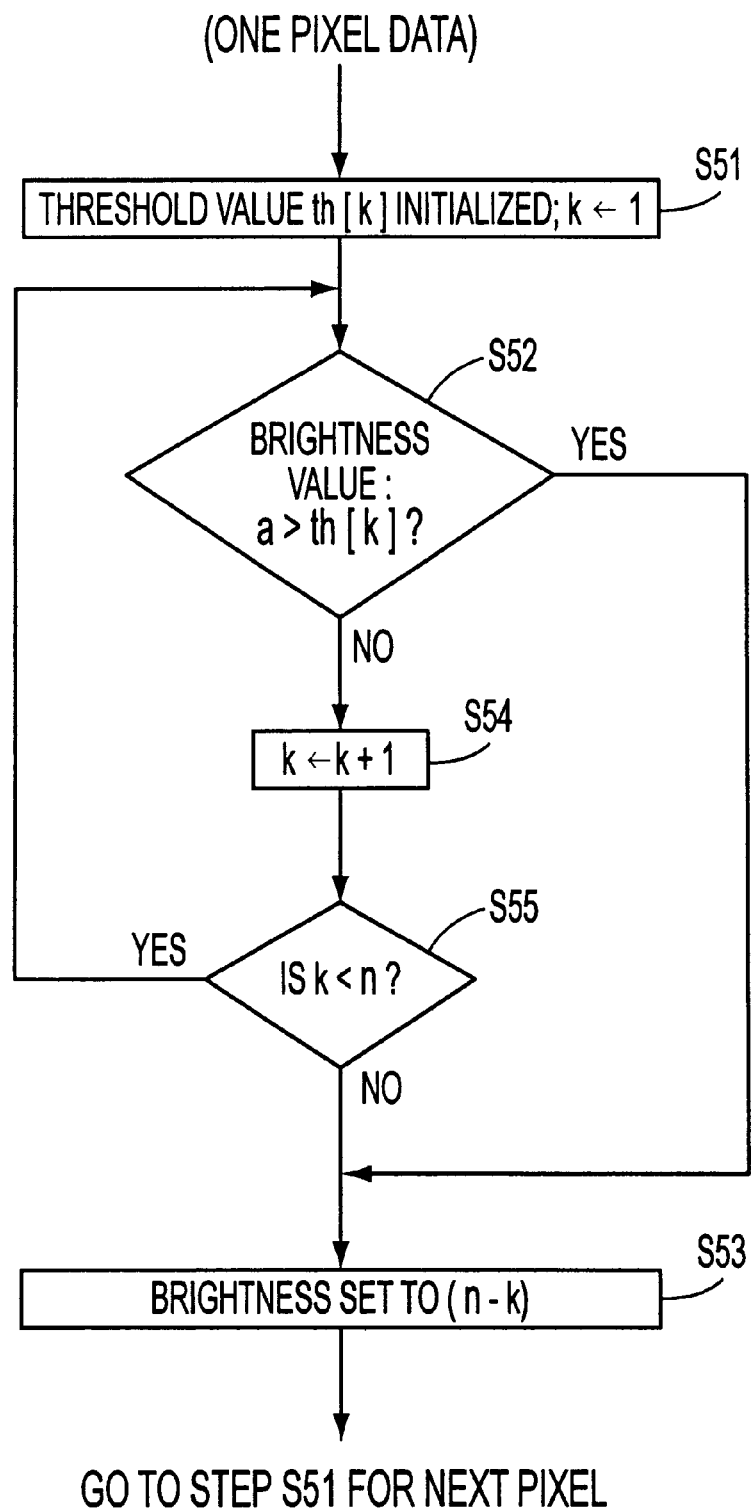
FIG. 10 is a flowchart explaining the n value conversion process in accordance with the embodiment shown in FIG. 7.

Next, after the shading correction has been completed, the n value conversion process is accomplished using the first through n−1st threshold values. One example of this n value conversion process will be described with reference to FIG. 10. The flowchart in FIG. 10 shows one n value conversion process for each pixel. In FIG. 10, an initialization is first performed concerning which of the threshold values will be selected out of the first through n−1st threshold values (step s51). This initialization is k=1 in this case. That is to say, the first threshold value th[1] is set as the initial threshold value. Next, for the brightness value a of the pixel being processed, the determination is made as to whether or not a >th[k] (step s52). In this case, k=1, so the determination is whether a>th[1]. Furthermore if a>th[1], the brightness value of this pixel is set to n−k (step s53). Here, assuming that the brightness values of the pixels are converted to the four values 0–3, when a>th[1], the brightness value of this pixel is set to "3" because n=4 and k=1.

In this manner, when the n value conversion (here, four value conversion) process is completed for one particular pixel, the n value conversion process is accomplished for the next pixel. For the next pixel, a determination is also made for the brightness a as to whether or not a >th[1]. Furthermore, when a >th[1] is not true, the flowchart moves to step s54 and k is incremented to k+1 (in this case, k=2). Then a determination is made as to whether k<n (step s55). When k<n, the flowchart returns to step s52 and a determination is made as to whether or not a>th[2]. If a >th[2], the brightness value of this pixel is set to n−k (step s53). At step S53, n=4 and k=2, so the brightness value of the pixel is set to "2". When a>th[2] is not true in the determination of whether or not a >th[2] in step s52, the flowchart moves to step s54 and k is incremented to k+1. Through this, the state k=3 is reached, a determination is made as to whether k<n (step s52), and when k<n, the flowchart returns to step s12. A determination is then made as to whether or not a>th[3]. Then if a >th[3], the brightness value of this pixel is set to n−k. This time, n=4 and k=3, so the brightness value of the pixel is set to f1ril. The same process is then accomplished for the next pixel.

Figure 11:
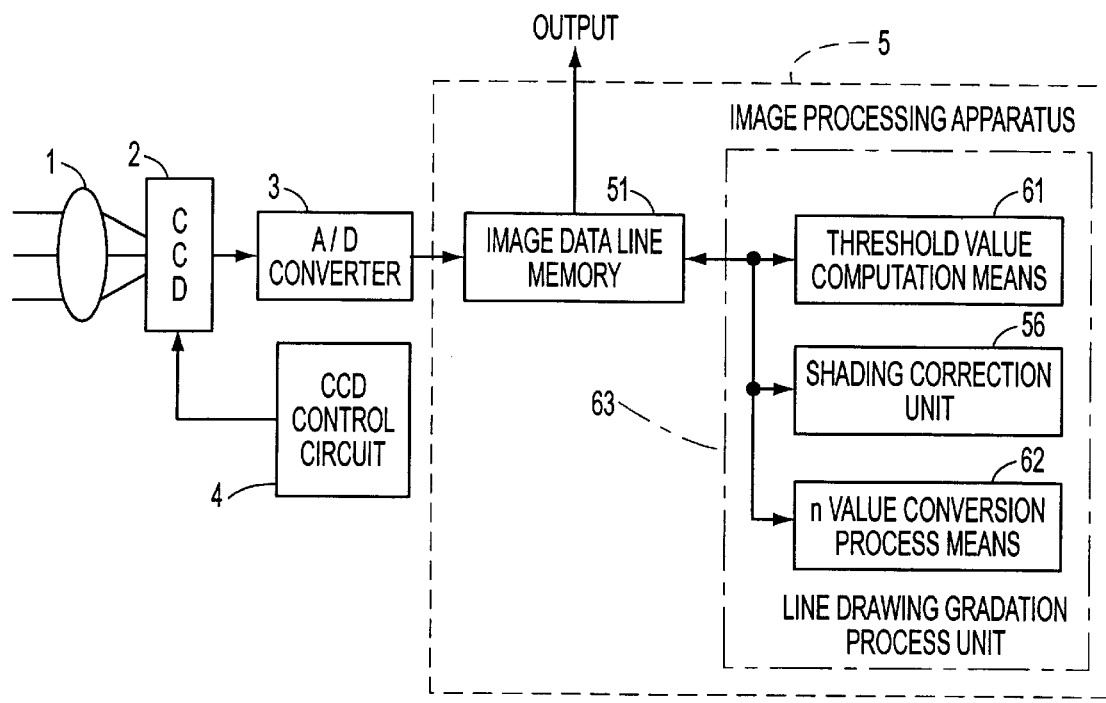
FIG. 11 is a drawing showing an apparatus in which a CCD camera is combined with an image processing apparatus in accordance with the embodiment as shown in FIG. 7.

FIG. 11 shows an example of the apparatus for this disclosed embodiment which corresponds to the schematic shown in FIG. 6. The apparatus comprises a lens 1, a CCD camera 2, an A/D converter 3, a CCD control circuit 4 and an image processing apparatus 5.

The image processing apparatus 5 accomplishes the processes described in this embodiment, and has an image data line memory 51, a threshold value computation means 61, an n value conversion process means 62 and a shading correction unit 56.

The shading correction unit 56 is the same as the shading correction unit 56 shown in FIG. 6, and is composed of a background prediction line memory 52, a background predicting means 53, a background result modifying means 54 and a background correcting means 55. The process contents performed by the shading correction unit 56 were explained above, and therefore an explanation is omitted here.

The threshold value computation means 61 computes the first through n−1st threshold values used in the n value conversion. As an example of the threshold value computation, the n−1 threshold values are computed using a process such as the one shown in the flowchart in FIG. 8. However, in actuality the first through n−1st threshold values are found from the image data of the screen uptaken immediately prior, and the process is accomplished while reflecting these threshold values in the image of the next screen.

Hereafter the operation of this image processing apparatus is described.

One line at a time of the image data uptaken undergoes shading correction by the above-described process in the shading correction unit 56. Simultaneously with this, the data necessary to compute the threshold values is obtained in the threshold value setting means 61 using one line at a time of data stored in the image data line memory 51. When the inputting of one screen has been completed, the first through n−1st threshold values are found by the sequence of processes in FIG. 8. The first through n−1st threshold values found in this manner are used as the threshold values in the image of the next screen.

When one line of data in the next screen is uptaken into the image data line memory 51, this one line of data undergoes shading correction and also undergoes an n value conversion process using the first through n−1st threshold values computed by the n value conversion process means 62 from the prior screen. In addition, simultaneously with this, the first through n−1st threshold values are computed by the threshold value determining means 61 using this one screen worth of data using each line of data of the screen being processed stored in the image data line memory 51. These are set as the new first through n−1st threshold values. In this manner, the first through n−1st threshold values are computed from one screen worth of image data uptaken immediately prior, and the process is accomplished while reflecting this in the image of the next screen.

The n value conversion process here is an n value conversion process that uses specific threshold values, such as the first through n−1st threshold values, and is an n value conversion suitable for line drawings such as characters where the existence of edges is particularly necessary. Hence, the threshold value computing means 61, the shading correction means 56 and the n value conversion process means 62 are considered to be the line drawing gradation process unit 63.

In FIG. 7 it is also possible to perform the process steps in the order step s32, step s31 and step s33.

As described above, with this embodiment, when an image uptaken by a photography means, such as a CCD camera or the like having a large number of gradations is displayed on a display unit such as an LCD having a small number of gradations, it is possible to eliminate the effects caused by shading and to reduce the gradations for images having shading. In particular, it is possible to eliminate the effects of shading, obtain a good image with no smearing and obtain an image that is extremely easy to see when objects in which a line drawing is drawn on a bright background.

Another embodiment of the invention determines whether or not the image being processed is a line drawing and accomplishes the above-described shading correction only on line drawings. The effects of shading appear more strikingly in line drawings than in natural images, so shading correction is accomplished only when the image being processed is a line drawing.

Figure 12:
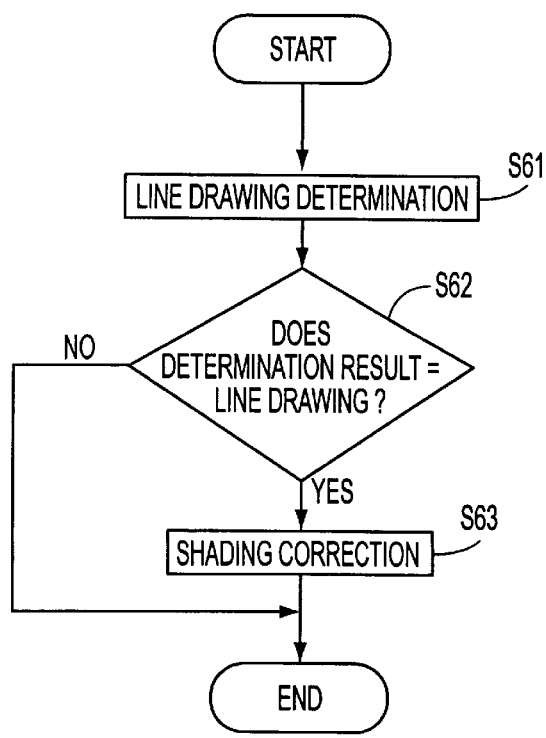
FIG. 12 is a flowchart describing the overall process of another embodiment of the invention.

FIG. 12 is a flowchart explaining schematically the overall sequence of processes in this embodiment. A process is performed for determining whether or not the image being processed is a line drawing (step s61), a determination is made on the basis of the results of this process as to whether or not the image is a line drawing (step s62), and a shading correction process is accomplished only when it is determined that the image is a line drawing (step s63).

The line drawing determining process here will be described with reference to the flowchart in FIG. 13. First, initialization is accomplished (step s71). This initialization sets to "1" a switch sw used to judge between a rise and a fall in the brightness ("1" in the case where a fall is determined and "0" in the case where a rise is determined"). The initialization also sets the value "leng" (indicating the cumulative length of the width of the line drawing portion) to "0" and the value "num" (indicating the number of lines) to "0".

Then, the brightness value a[i−1] of the immediately prior pixel is subtracted from the brightness value a[i] of the pixel being processed, and this difference is called C (step S72).

Next, the state of the switch sw used in judging between a rise and a fall in the brightness is determined (step s73). Here, because sw="1" is set as the initial setting, the fall detection process is accomplished and a determination is made as to whether or not $C \leq -\gamma$ (step s74). Here, $\gamma$ is a value that is a criterion in judging between a rise and a fall. When the input image has 256 gradations, the setting $\gamma=15$ is made. However, this value may be set to an optimum value depending on a variety of conditions.

When $C \leq -\gamma$ in step s74, the determination is that the brightness value is falling more than a designated amount, and the switch sw is set to "0" in order to detect a rise as the next process, and the position i of this pixel is set as the start position (step s75). Accordingly, the position of the pixel where the brightness value is falling more than a designated amount is preserved.

Then, a determination is made as to whether or not the processes have been completed for all pixels (step s76). If the processes have not been completed, the flowchart returns to step s72 and the difference in brightness value from the immediately prior pixel is found for the next pixel (step s72). A determination of whether or not sw="1" is also accomplished, but at this time sw="0", and consequently detection of a rise is started.

This detection of a rise determines if $C \geq \gamma$ (step s77), and if $C \geq \gamma$, the determination is that the brightness value has risen at least by a designated amount. If $C \geq \gamma$ is not true, the determination is that the brightness value has not risen more than a designated amount.

Figure 14:
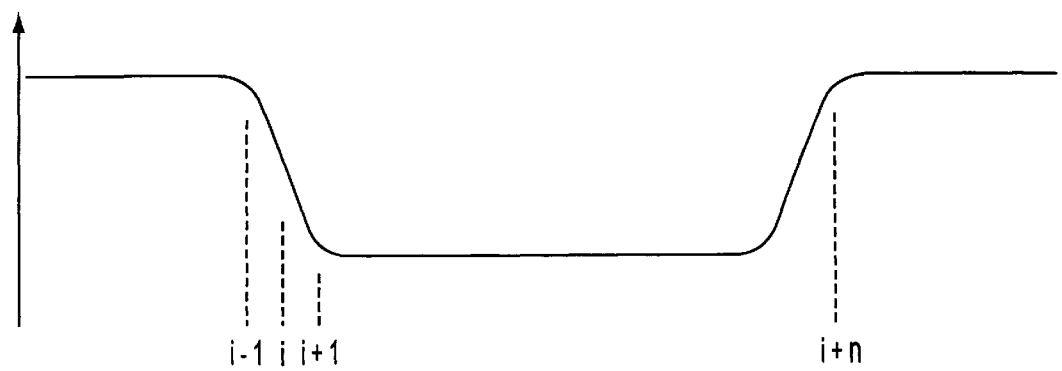
FIG. 14 is a drawing showing the data necessary in line drawing determination using the change in brightness in the character areas as an example.

Taking the case shown in FIG. 14 as an example, at the pixel in position i, when the brightness difference C from the immediately prior pixel (the pixel in position i−1) is such that $C \geq \gamma$, this position i is preserved. For the next pixel (the pixel in position i+1) the difference in brightness value from the immediately prior pixel is found and a determination of whether $C \geq \gamma$ is made. But in this case, $C \geq \gamma$ is not true, so the determination of whether $C \geq \gamma$ is made again for the next pixel. This process is repeated until the process of determining whether $C \geq \gamma$ is executed for the i+n pixel, $C \geq \gamma$ is established, and a rise is detected.

Furthermore, when a rise is detected, the flowchart moves to the process in step s78, and the setting sw="0" is made in order to detect a fall as the next process. The character width at this time is added to the value of leng to get the value leng indicating the cumulative total of the widths of the characters. Accordingly, the computation "leng +{i−start}" is made. In the example in FIG. 14, the computation "leng +{(i+n)−i}" is made. Furthermore, 1 is added to the value num (indicating the total number of lines at this point).

When the processes are completed for all of the pixels comprising the image (step s76), the thickness of the line per pixel is determined using the total leng and num calculated in step s78 by dividing the total leng by the total num. Furthermore, this thickness per pixel is compared to a given value $\delta$ to determine whether or not the image is a line drawing (step s79). Here, $\delta$ is a value set to $\delta=7$ when the resolution is an image of 320 pixels by 240 pixels. However, this value may also be set to at optimum value depending on a variety of conditions.

There are many high frequency components of a line drawing, and there are many low frequency components of a natural image. Hence, the value of leng/num, which indicates the average value of the thickness of the line, is small in the case of a line drawing and large in the case of a natural image. When leng/num$\leq \delta$, the image is determined to be a line drawing, while if leng/num$\leq \delta$ is not true, the image is determined to be something other than a line drawing, such as a natural image (steps s80a and s80b).

In this manner, the determination is made as to whether the image is a line drawing or something other than a line drawing. Furthermore, the shading correction process described in the first embodiment is performed only in the case of a line drawing.

Figure 15:
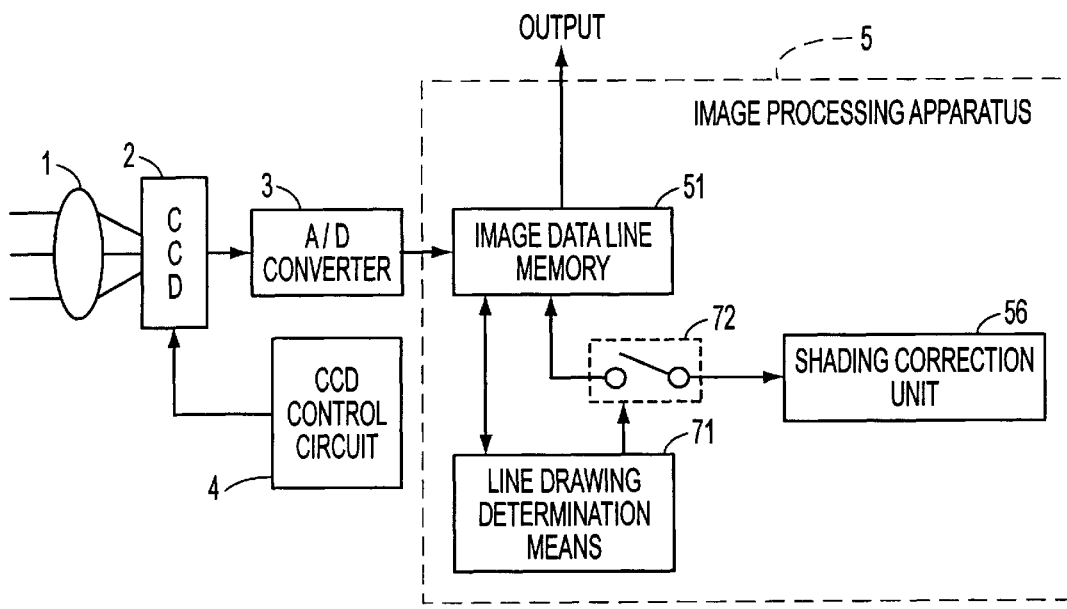
FIG. 15 is a drawing showing an apparatus in which a CCD camera is combined with an image processing apparatus in accordance with the embodiment shown in FIG. 12.

FIG. 15 shows an example of the composition of an apparatus used to realize this embodiment, and corresponds schematically to FIG. 6. The apparatus comprises a lens 1, a CCD camera 2, an A/D converter 3, a CCD control circuit 4, and an image processing apparatus 5.

The image processing apparatus 5 performs the processes described in this embodiment, and has an image data line memory 51, a line drawing determination means 71, a shading correction unit 56 and a shading correction setting switch 72 for setting whether or not to perform a shading correction.

This shading correction unit 56 is the same as the shading correction unit shown in FIG. 6, and is composed of the background prediction line memory 52, the background predicting means 53, the background result modifying means 54 and the background correcting means 55. The contents of the process performed by this shading correction unit 56 were described previously and explanation is omitted here.

Figure 13:
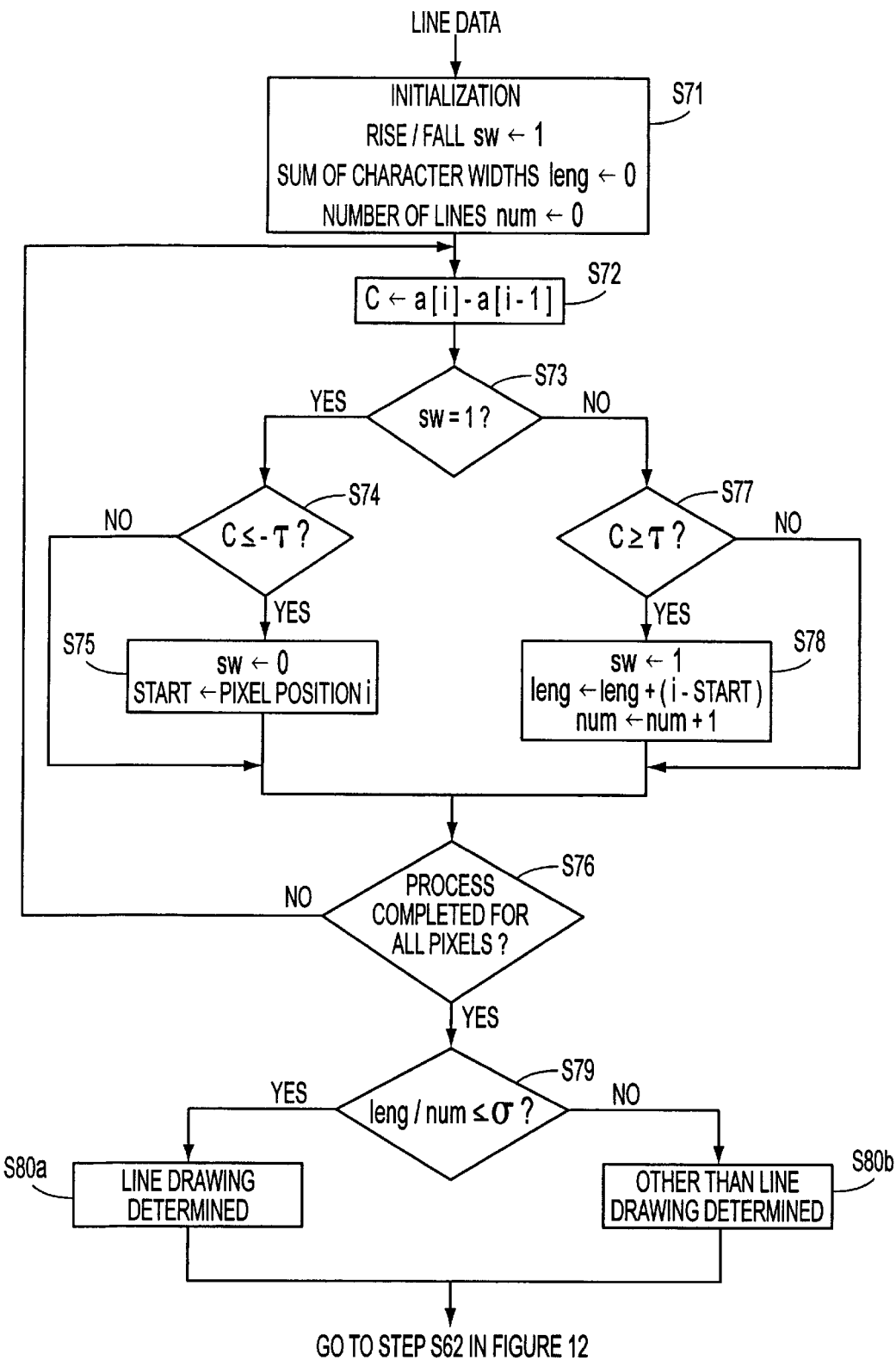
FIG. 13 is a flowchart explaining the process sequence for line drawing determination in accordance with the embodiment shown in FIG. 12.

The line drawing determination means 71 performs the processes shown in the flowchart in FIG. 13. The actual process is performed while showing or reflecting in the image of the next screen, the results of determining whether or not the image data of a screen uptaken immediately prior is a line drawing.

Accordingly, the shading correction setting switch 72 is set to an initial setting (for example "off").

When the shading correction setting switch 72 is set to off as the initial setting, the one line worth of image data uptaken first does not undergo shading correction, and is displayed one line at a time without change. Simultaneously, the process is performed by the line drawing determination means 71 is performed on each line in the sequence of processes in FIG. 13, using the one line worth of data stored in the image data line memory 51.

Furthermore, when the processes have been completed for one screen, the determination is made as to whether or not that screen is a line drawing. The results of this determination are used in the judgment of the type of image in the next screen. For example, when it is determined that the image of the first screen is a line drawing, the shading correction setting switch 72 is turned on and shading correction is performed for the next screen.

When the shading correction setting switch 72 is turned on, each one line of data uptaken into the image data line memory 51 is output to each line after undergoing shading correction on each line. Simultaneously, processing of one screen is performed on each line by the line drawing determination means 71 in the order shown in FIG. 13 using the data stored for each line in the image data line memory 51. Furthermore, when the processes have been completed for one screen, a determination is made as to whether or not this screen is a line drawing. The results of this determination are used in judging the type of image of the next screen. In this way, the process is performed while showing or reflecting in the image of the next screen the results of determining whether or not the image data of one screen uptaken immediately prior is a line drawing.

As described above, a determination is made as to whether or not the image being processed is a line drawing. Shading correction is performed only on line drawings. In addition, natural images other than line drawings have almost no noticeable effects of shading, and consequently no special processes are executed. Accordingly, shading correction performed only on line drawings shortens the processing time.

Another embodiment of the invention determines whether or not the image being processed is a line drawing, and when the image is determined to be a line drawing, performs a shading correction, and also performs a gradation process using the first through n−1st threshold values found, as described above. When the image is not a line drawing, the process deems the image to be a natural image and performs a gradation altering process suitable to a natural image.

Figure 16:
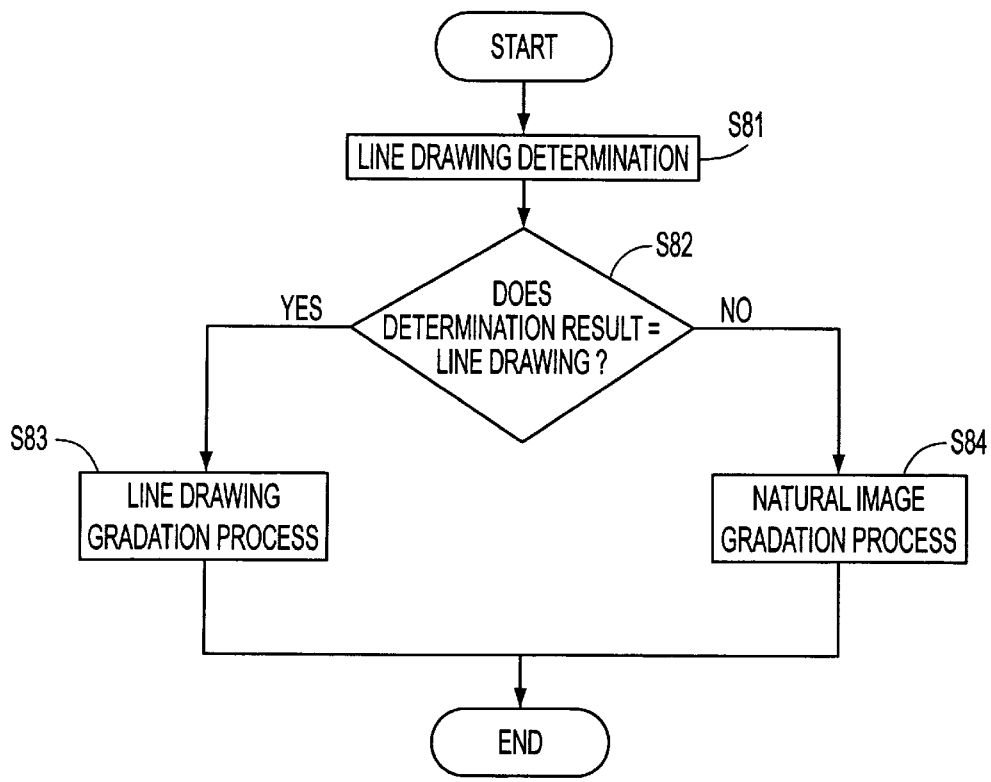
FIG. 16 is a flowchart describing the overall process of another embodiment of the invention.

FIG. 16 is a flowchart describing the schematic order of processes in this embodiment. First, a process is performed (step s81) in order to accomplish line drawing determination. Determination of whether or not the image is a line drawing is accomplished using the results of this process (step s82). If the image is a line drawing, a line drawing gradation process is performed (step s83). If the image is not a line drawing, a natural image gradation process is performed (step s84).

The process used to make a line drawing determination in step s81 is the process described in the flowchart in FIG. 13. When this process determines that the image is a line drawing, a line drawing gradation process is performed. This line drawing gradation process is the process described previously, and the schematic order of processes is such that, as shown in FIG. 7, n−1 threshold values used in the n value conversion are found from the image being processed (step s31). This is a process for finding the first through third threshold values when the image data has 256 gradations ranging from 0 to 255, for example, input by a CCD camera or the like is converted into image data having four gradations. A shading correction process (step s32) is then accomplished, and an n value conversion process is accomplished using the n−1 threshold values (step s33).

On the other hand, when the image is determined to not be a line drawing, a gradation process suitable for a natural image is accomplished. This gradation process is suitable for a natural image and is a gradation process such that two-dimensional gradation is obtained using, for example, the dither method or the error diffusion method.

Accordingly, a gradation process which preserves the edges is performed for line drawings, while for natural images a two-dimensional gradation process such as the dither process or error diffusion process is executed. It is thus possible to achieve an image which appears better by reducing the number of gradations.

Figure 17:
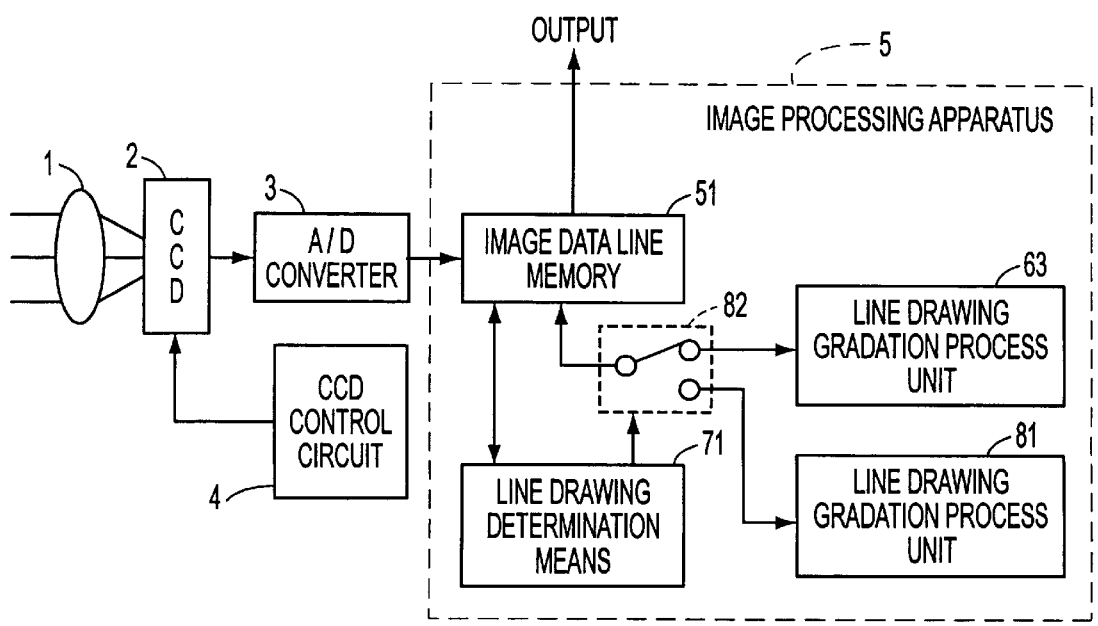
FIG. 17 is a drawing showing an apparatus in which a CCD camera is combined with an image processing apparatus in accordance with the embodiment shown in FIG. 16.

FIG. 17 shows an example of the apparatus used to realize this embodiment. The apparatus comprises a lens 1, a CCD camera 2, an A/D converter 3, a CCD control circuit 4 and an image processing apparatus 5.

The image processing apparatus 5 has, in the case of this embodiment, an image data line memory 51, a line drawing determination means 71, a line drawing gradation process unit 63, a natural image gradation process unit 81, and a selection switch 82 which selects between the line drawing gradation process unit 63 and natural image gradation process unit 81.

The aforementioned line drawing determination means 71 is the same as the line drawing determination means 71 indicated in the composition in FIG. 15, and performs the process described in FIG. 13. After the process has been completed for one frame, i.e., one scan frame or one screen, the aforementioned line drawing determination means 71 determines whether the image of this screen is or is not a line drawing and outputs to the selection switch 82 a signal indicating whether the drawing is a line drawing.

The selection switch 82 performs a switching operation so as to select the line drawing gradation process unit 63 upon receiving from this line drawing determination means 71 a signal indicating that the image is a line drawing. The selection switch 82 also selects the natural image gradation process unit 81 upon receiving a signal indicating that the image is not a line drawing.

The line drawing gradation process unit 63 is the same as the line drawing gradation process unit 63 described in the composition diagram in FIG. 11, and is composed of a threshold value determination means 61, a shading correction unit 56 and an n value conversion process means 62.

The line drawing determination means 71 performs the process described in the flowchart in FIG. 13, but as noted above, after the process has been completed for one screen, the results are reflected in the image data of the next screen. Consequently, the selection switch 82 is set to the natural image gradation process unit 82 side in the initial setting.

Accordingly, the one line at a time of image data uptaken is output after undergoing a gradation process by the natural image gradation process unit 82. Simultaneously, one screen worth of processing is performed on each line by the line drawing determination means 71 as shown in FIG. 13 using the one line at a time of data stored in the image data line memory 51. Then when the process has been completed for one screen, a determination is made as to whether or not this screen is a line drawing. The results of this determination are used in judging the type of image in the next screen. For example, when it is determined that the image of the first screen is a line drawing, the selection switch 82 switches to the line drawing gradation process unit 63 side, and the next screen undergoes a gradation process by means of the line drawing gradation process unit 63.

In this manner, the process is performed while showing or reflecting in the image of the next screen the results of determining whether or not the image data of one screen uptaken immediately prior is a line drawing.

As described above, with this embodiment, a determination is made as to whether or not the image being processed is a line drawing, and when the image is a line drawing, a shading correction is accomplished and a line drawing gradation process is also accomplished using the first through n−1st threshold values found as described above. When the image is not a line drawing, the image is deemed to be a natural image and a gradation altering process suitable to a natural image, such as the dither method or the error diffusion method, is accomplished. Consequently, a gradation process suitable for each type of image is accomplished, so that when an image uptaken by a CCD camera or the like is displayed on a reflective LCD, it is possible to display an image that looks better by executing a process suitable to either a line drawing or a natural image, regardless of the object being photographed.

However, in the above-described embodiments, when the image data is continuously input from a CCD camera or the like, a process is performed using the data (the first through n−1st threshold values, the determination of whether or the image is a line drawing, and so forth) created by the prior one frame (one screen), to simplify the overall process. This process is described with reference to the flowchart in FIG. 18.

Figure 18:
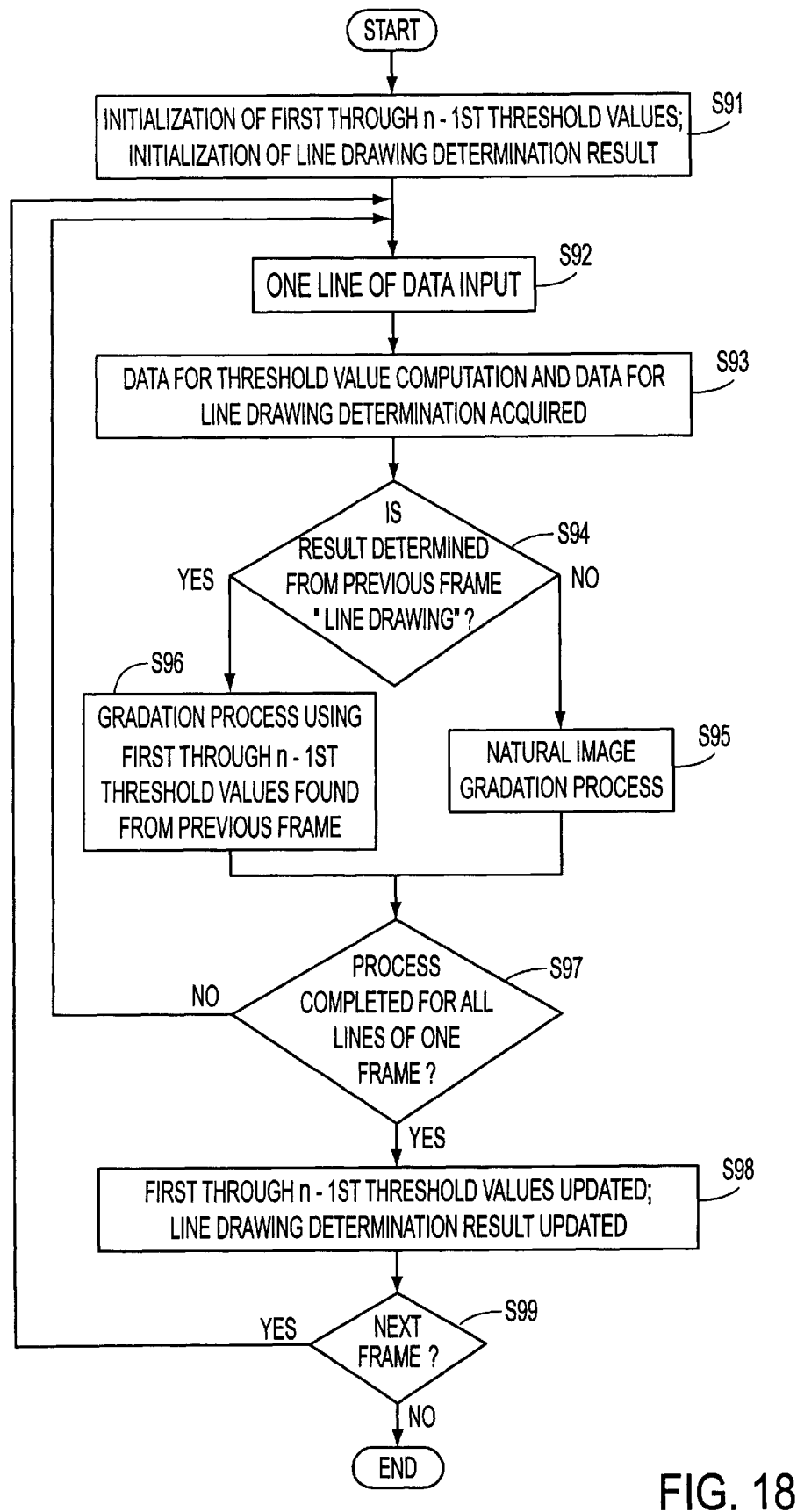
FIG. 18 is a flowchart explaining the processes when an image is continuously input in the invention according to the embodiment shown in FIG. 16.

In FIG. 18, initialization of the threshold values and line drawing determination result is accomplished (step s91). This initialization of the threshold values is a process that sets appropriate values as the initial values of the first through n−1st threshold values th[1]—th[n−1], for example, when performing n value conversion, and when natural image is set as the initial value of the line drawing determination result.

Next, after the input of one line of data in a certain frame has been accomplished (step s92), the various types of data from this one line of data are acquired (step s93). These various types of data are data such as leng and num described in the flowchart in FIG. 13 as data used in creating a cumulative frequency distribution necessary in calculating the threshold values and in determining whether or not an image is a line drawing.

Next, a determination is made as to whether or not the image is a line drawing on the basis of the immediately prior frame data (step s94). If the image is not a line drawing, a gradation process is accomplished using a natural image gradation process (step s95). If the image is a line drawing, a line drawing gradation process (including a shading process) is accomplished (step s96) using the first through n−1st threshold values calculated on the basis of the immediately prior frame data.

Next, a determination is made as to whether or not the processes for all lines in the one frame have been completed (step s97), and if these have not been completed, the flowchart returns to step s92. If the processes have been completed, the first through n−1st threshold values used in n value conversion are updated and the line drawing determination result is updated (step s98). Furthermore, a determination is made as to whether or not there is a next frame data (step s99), and if there is a next frame data, the processes from step s92 on are conducted for this new frame. The processes conclude if there is no next frame.

When the image data is input continuously, it is possible to conduct the processes using the line drawing determination result and the threshold values found in the prior frame in the frame currently being uptaken.

The disclosed invention includes processes to cope with lens aberrations.

Figure 19A:
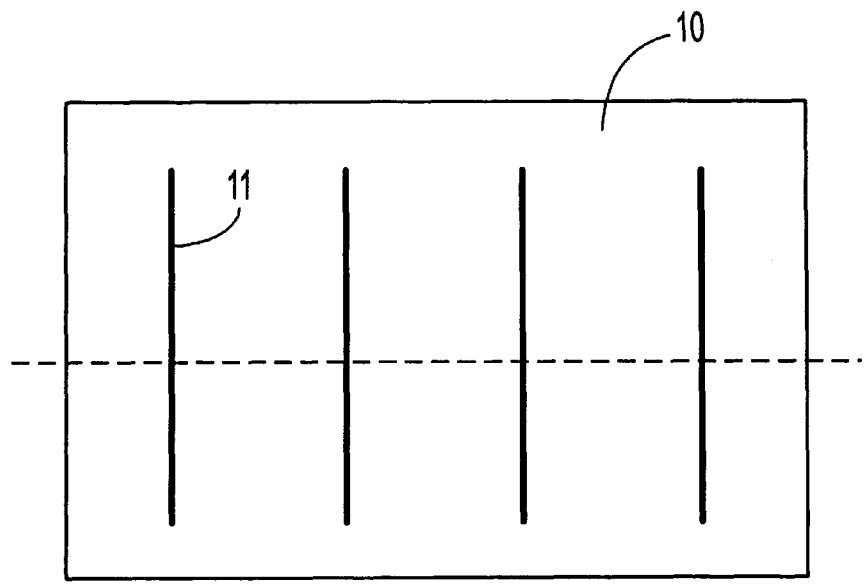
FIGS. 19($a$)–19($b$) are drawings showing an example of the brightness distribution of pixels that have received the effects of a lens aberration and an example of images used to explain the process for coping with a lens aberration.
Figure 19B:
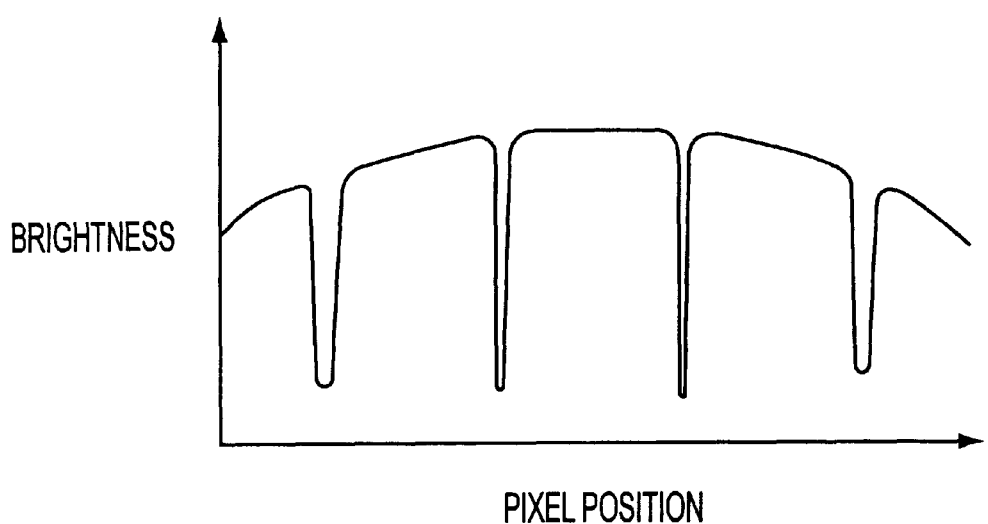

The effect caused by lens aberration is a phenomenon such that when a line drawing 11 comprising straight lines of the same thickness and density in the middle of a background 10, for example as shown in FIG. 19a, the brightness of the image uptaken by passing through the lens (the brightness in the line indicated by the dashed line in FIG. 19a) is, as shown in FIG. 19b, an image with the width of the lines thicker and the contrast in brightness with the background smaller the closer to the edge of the image. Accordingly, sharpness is lost in comparison to the center part.

Figure 20A:
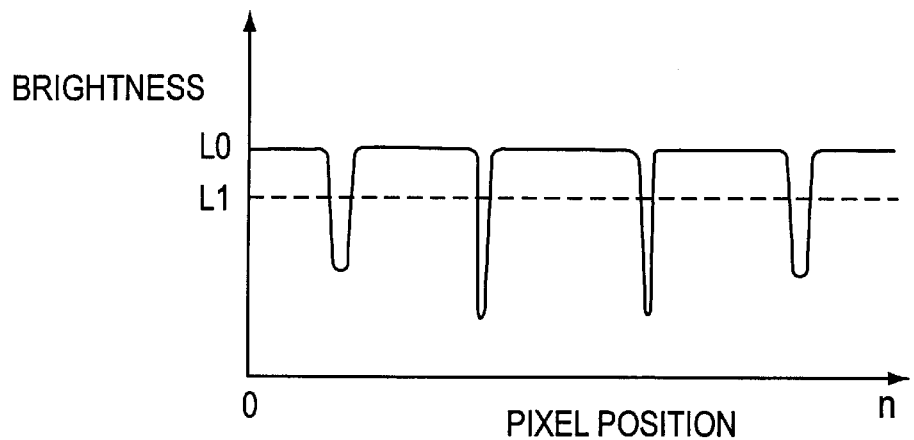
FIGS. 20($a$)–20($c$) are drawings showing different relationships between brightness and pixel position, and a coefficient and the pixel position, as they relate to coping with a lens aberration.

In order to resolve this, a brightness value L1 that is smaller than the desired background brightness L0, as shown in FIG. 20a, is set (indicated by the dashed line in the figure) for the data (FIG. 3d) after the background correcting process. By multiplying this part having a smaller brightness value by a coefficient that takes into consideration the lens aberration, it is possible to at least revise the height of the brightness and improve the contrast.

Figure 20B:
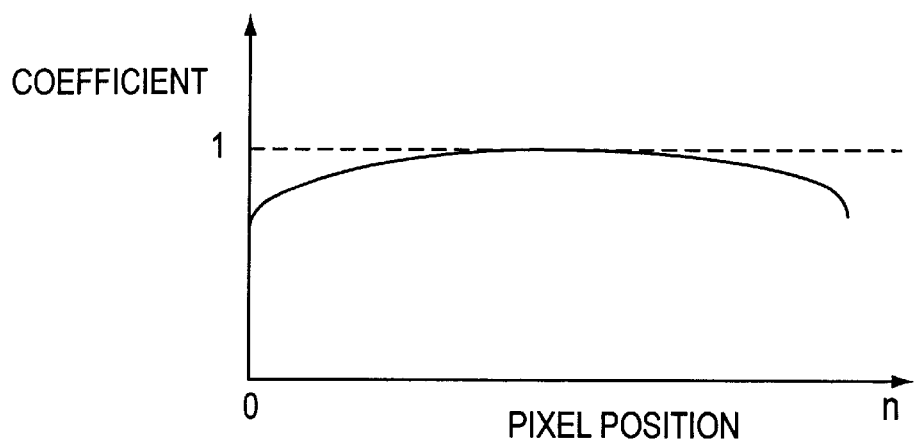
Figure 20C:
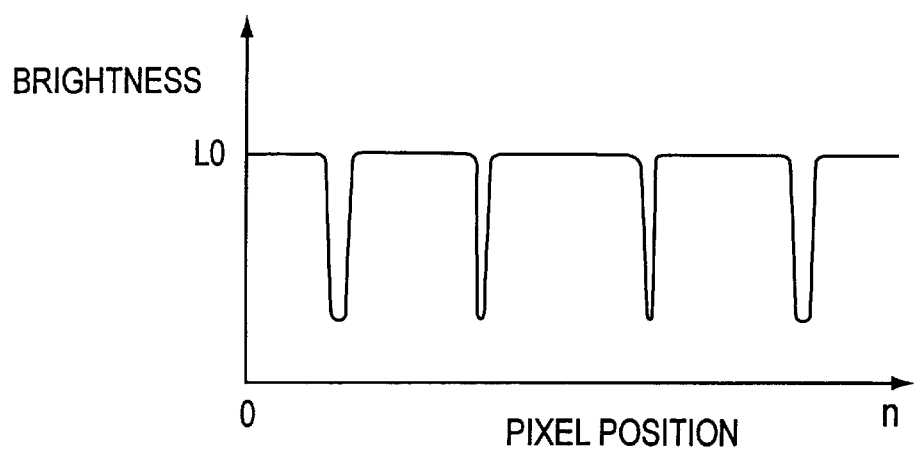

The brightness value L1 that is smaller than the desired background brightness L0 is, for example, a value obtained by multiplying the desired background brightness L0 by 0.8. In addition, the coefficient that takes into consideration the above-described lens aberration is a coefficient value that results in a curve, such as the one in FIG. 20b, on the pixels at positions 0, 1, 2, . . . n, of the one particular line in the screen. The coefficient is "1" in the center part, and moving from the center part to the edges the coefficient value is reduced (coefficient value<1). Because the effect of the lens aberration can be determined in advance, it is possible to find the coefficient beforehand through calculations. Hence, by multiplying brightness values of the line drawing portions of FIG. 20a by the coefficient values obtained from this kind of coefficient curve, the brightness values of the line drawing existing near the edges become smaller, as shown in FIG. 20c, so that the contrast with the background is increased and the effect of the lens aberration is improved.

The data used in line drawing determination and the data used in computing the threshold values needed for n value conversion need not be found from the entirety of one screen. But, may be found after omitting the periphery of the screen. This is because there is little important data at the periphery of the screen when finding this data.

In addition, the line drawing determination is accomplished in units of one screen. But, it would be acceptable to partition the screen into line drawing regions and natural image regions so as to: 1) make handling easier for an image in which both characters and scenery are mixed; 2) make a determination of whether or not each of these regions is a line drawing; and 3) accomplish the necessary processes in each region.

The invention has been described as processes for brightness (monochrome), but processes for color are also possible. It is possible to handle data input in color (e.g., RGG) by converting this to other data (e.g., YUV) relating to brightness and color, performing the above-described processes for brightness and again converting the data back (e.g., to RGB).

The processing program for accomplishing the processes of the present invention can be stored on a storage medium such as a floppy disk, an optical disk or a hard disk. The present invention may also be of a format that includes this kind of storage media, and in addition may be of a format that obtains data from a network.

As described above, the invention removes the effects of shading in each designated line for line drawings such as characters or diagrams. In particular, by accomplishing processes one line at a time, it is possible to reduce the amount of working memory by using only one line worth of image data line memory and background prediction line memory, thereby contributing to making the apparatus as a whole more compact and lighter in weight, and also helping to reduce costs. In addition, because the processes are accomplished on each line, when the process for one line is completed while uptaking the image, it can be displayed. When the process for the next line is completed, it can also be displayed. Consequently, it is easy to cope with continuous input.

In addition, by combining this shading correction and the n value conversion process using n−1 threshold values, it is possible to eliminate the effects of shading while reducing gradations in a state with the edges preserved for images having shading photographed by an area sensor such as a CCD camera or the like.

By accomplishing a process of shading correction only when the image is a line drawing, it is possible to accomplish a shading correction process only on line drawings. Accordingly, it possible to make the shading of the line drawing less noticeable, and to reduce processes and shorten processing time by accomplishing the correction process only on line drawings.

Furthermore, by determining whether or not an image is a line drawing and accomplishing a shading correction and a gradation process (using n−1 threshold values if the image is a line drawing, and if the image is not a line drawing deeming the image to be a natural image and accomplishing a gradation process through a gradation process method suitable to a natural image) the process reduces the number of gradations when displaying an image photographed by an area sensor such as a CCD camera or the like on a reflective LCD or the like. The shading correction is accomplished only for line drawings as an n value conversion process using n−1 threshold values, while a gradation process suitable to natural images is accomplished for natural images (e.g., the dither method or the error diffusion method). Consequently, a process suited to the photographed object is accomplished automatically regardless of the photographed image, so that it is possible to display a quality image.

In addition, for each process which combines the various processes of shading correction and the above- described n value conversion process and line drawing determination process, a process for each line is possible and allows the size of the working memory to be reduced while also making it easy to cope with continuous input.

While the invention has been described in conjunction with specific embodiments thereof, it is evident that many alternatives, modifications and variations may be apparent to those skilled in the art. Accordingly, the preferred embodiments of the invention as set forth herein are intended to be illustrative, not limiting. Various changes may be made without departing from the spirit and scope of the invention as defined in the following claims.

What is claimed is:

1. An image processing method in which a determination is made for each designated line of input image data as to whether or not pixels comprising that line comprise edges of a line drawing, wherein the method comprises the steps of:

finding brightness values of pixels, when the pixels do not comprise the edge, by using a computation on the basis of brightness values of pixel positions corresponding to a line processed prior to the designated line and updating the brightness values processed prior to this with the brightness values which are found;

conducting a process, when the pixels comprise the edge, which maintains without change the brightness values of the pixel positions corresponding to the line processed prior to the designated line and repeatedly executing the process for each pixel comprising that designated line one designated line at a time;

conducting, in lines to be processed, a background predicting process to find a brightness value for each pixel which excludes effects of brightness of the edge portion in the line drawing;

setting a designated search range, when the brightness value for each pixel in the designated line obtained in the background predicting process is determined to be a desired brightness value or less, which includes the pixels having the desired brightness value;

finding the change in brightness from adjacent pixels within this search range for each pixel, and when the number of pixels in which there is substantially no change in brightness within the search range is not less than a preset number, a determined brightness value is determined on the basis of the brightness value of the pixels with little change in brightness, and when the number of pixels with substantially no change in brightness in the search range is smaller than a preset number, the determined brightness value is determined on the basis of the brightness values of the pixels over the entire search range;

determining whether or not an effect of the line drawing other than the effects of brightness of the edge portion are included in the brightness value for each pixel in the lines to be processed, obtained from the background predicting process;

conducting a modifying process for background prediction when the effects of the line drawing other than the effects of brightness of the edge portion are included in the brightness value, to find a brightness value for each pixel excluding the effects of the line drawing;

comparing a result of modifying the background prediction and the brightness value set as the desired value, and finding the difference between these values; and conducting a background correcting process to correct the brightness value so as to achieve a desired brightness value on the basis of the brightness value of each pixel obtained by the modifying process for background prediction by adding the difference that is found to the brightness value of the pixel position corresponding to said input image data.

2. An image processing method, comprising the steps of:

determining for each designated line of input image data whether or not pixels that comprise the designated line are pixels that comprise an edge portion of a line drawing;

finding brightness values of pixels, when the pixels do not comprise the edge, by using a computation on the basis of brightness values of pixel positions corresponding to a line processed prior to the designated line and updating the brightness values processed prior to this with the brightness values which are found;

conducting a process, when the pixels comprise the edge, which maintains without change the brightness values of the pixel positions corresponding to the line processed prior to the designated line and repeatedly executing the process for each pixel comprising that designated line one designated line at a time;

finding, through a background predicting process conducted for each designated line, the brightness value of each pixel excluding the effects of the brightness of the edge portions in the line drawing;

setting a designated search range, when the brightness value for each pixel in the designated line obtained in the background predicting process is determined to be a desired brightness value or less, which includes the pixels having the desired brightness value;

finding the change in brightness from adjacent pixels within this search range for each pixel, and when the number of pixels in which there is substantially no change in brightness within the search range is not less than a preset number, a determined brightness value is determined on the basis of the brightness value of the pixels with little change in brightness, and when the number of pixels with substantially no change in brightness in the search range is smaller than a preset number, the determined brightness value is determined on the basis of the brightness values of the pixels over the entire search range;

modifying background prediction results using the determined brightness value; and, comparing the result of modifying the background prediction results and the brightness value set as the desired value, finding the difference between these values, and achieving the desired brightness value by adding the difference that is found to the brightness value of the pixel position corresponding to said input image data.

3. The image processing method as defined in claim 2, wherein the step of finding brightness values of the pixels by using a computation includes finding the average of the brightness values of the pixel positions corresponding to the lines processed prior to the designated line and the brightness values of the pixels currently being processed.

4. An image processing method, comprising the steps of:

acquiring data used to find n−1 threshold values necessary in converting image data in each line of input image data into n values, n being an integer greater than 1;

finding n−1 threshold values after the step of acquiring data is completed for a specific line;

initiating shading correction for each designated line on said input image data;

converting the image which has undergone shading correction into n values with n−1 threshold values;

determining, using shading correction for each designated line of input image data, whether or not pixels comprising the designated line are pixels comprising an edge portion of a line drawing;

finding the brightness values of pixels being processed when it is determined that the pixels being processed are not pixels comprising the edge portion by using a computation on the basis of the brightness values of corresponding pixel positions of the lines processed prior to the designated line;

updating the brightness values processed prior to the designated line by the brightness values that are found;

maintaining without change, when the pixels being processed comprise the edge, the brightness values of the corresponding pixel positions of the lines processed prior to the designated line and repeatedly conducting the step of maintaining for each pixel comprising the designated line, one designated line at a time;

conducting a background predicting process which finds, for each designated line, the brightness values of each pixel excluding the effects of the brightness of the edge portions in the line drawing, wherein when the brightness value for each pixel in the designated line obtained in the background Predicting process is determined to be a desired brightness value or less, a designated search range is set which includes pixels having this brightness value, the change in brightness from adjacent pixels within this search range is found for each pixel, and when the number of pixels in which there is substantially no change in brightness within the search range is not less than a preset number, the brightness value is determined on the basis of the brightness value of the pixels with substantially no change in brightness, and when the number of pixels with little change in brightness in the search range is smaller than a preset number, the brightness value is determined on the basis of the brightness values of the pixels over the entire search range, and background prediction results are modified using these determined values;

comparing and finding the difference between the results of modifying the background prediction results and the brightness value set as the desired value; and, finding a background correction to achieve the desired brightness value by adding the difference to the brightness values of the pixel positions corresponding to the input image data.

5. An image processing method, comprising the steps of:

acquiring, for each designated line of an image, data necessary to determine whether or not the image is a line drawing from the image data in each designated line;

determining whether or not the image is a line drawing;

initiating shading correction in each designated line when the image is determined to be a line drawing;

determining, using shading correction for each designated line of input image data, whether or not pixels comprising the designated line are pixels comprising an edge portion of a line drawing;

finding the brightness values of pixels being processed when it is determined that the pixels being processed are not pixels comprising the edge portion by using a computation on the basis of the brightness values of corresponding pixel positions of the lines processed prior to the designated line;

updating the brightness values processed prior to the designated line by the brightness values that are found;

maintaining without change, when the pixels being processed comprise the edge, the brightness values of the corresponding pixel positions of the lines processed prior to the designated line and repeatedly conducting the step of maintaining for each pixel comprising the designated line, one designated line at a time;

conducting a background predicting process which finds, for each designated line, the brightness values of each pixel excluding the effects of the brightness of the edge portions in the line drawing, wherein when the brightness value for each pixel in the designated line obtained in the background predicting process is determined to be a desired brightness value or less, a designated search range is set which includes pixels having this brightness value, the change in brightness from adjacent pixels within this search range is found for each pixel, and when the number of pixels in which there is substantially no change in brightness within the search range is not less than a preset number, the brightness value is determined on the basis of the brightness value of the pixels with substantially no change in brightness, and when the number of pixels with little change in brightness in the search range is smaller than a preset number, the brightness value is determined on the basis of the brightness values of the pixels over the entire search range, and background prediction results are modified using these determined values;

comparing and finding the difference between the results of modifying the background prediction results and the brightness value set as the desired value; and, finding a background correction to achieve the desired brightness value by adding the difference to the brightness values of the pixel positions corresponding to the input image data.

6. An image processing method, comprising the steps of:

acquiring data necessary to determine whether or not the image is a line drawing from image data in each designated line of input image data;

determining whether or not the image is a line drawing;

acquiring data to find n−1 threshold values necessary in converting the image data in each designated line of the input image data into n values for each designated line, n being an integer;

finding n−1 threshold values for a specific line;

initiating shading correction in each designated line when the image is determined to be a line drawing, and converting the image to n values using the n−1 threshold values;

initiating a gradation process which obtains a two-dimensional gradation of the image when the image is not determined to be a line drawing;

determining, using shading correction for each designated line of input image data, whether or not pixels comprising the designated line are pixels comprising an edge portion of a line drawing;

finding the brightness values of pixels being processed when it is determined that the pixels being processed are not pixels comprising the edge portion by using a computation on the basis of the brightness values of corresponding pixel positions of the lines processed prior to the designated line;

updating the brightness values processed prior to the designated line by the brightness values that are found;

maintaining without change, when the pixels being processed comprise the edge, the brightness values of the corresponding pixel positions of the lines processed prior to the designated line and repeatedly conducting the step of maintaining for each pixel comprising the designated line, one designated line at a time;

conducting a background predicting process which finds, for each designated line, the brightness values of each pixel excluding the effects of the brightness of the edge portions in the line drawing, wherein when the brightness value for each pixel in the designated line obtained in the background predicting process is determined to be a desired brightness value or less, a designated search range is set which includes pixels having this brightness value, the change in brightness from adjacent pixels within this search range is found for each pixel, and when the number of pixels in which there is substantially no change in brightness within the search range is not less than a preset number, the brightness value is determined on the basis of the brightness value of the pixels with substantially no change in brightness, and when the number of pixels with little change in brightness in the search range is smaller than a preset number, the brightness value is determined on the basis of the brightness values of the pixels over the entire search range, and background prediction results are modified using these determined values:

comparing and finding the difference between the results of modifying the background prediction results and the brightness value set as the desired value; and, finding a background correction to achieve the desired brightness value by adding the difference to the brightness values of the pixel positions corresponding to the input image data.

7. The image processing method as defined in claim 6, wherein step of finding brightness values of the pixels by using a computation includes finding the average of the brightness values of the pixel positions corresponding to the lines processed prior to the designated line and the brightness values of the pixels currently being processed.

8. An image processing apparatus, comprising:

an image data line memory that stores data of designated lines of input image data;

background predicting means for determining whether or not respective pixels comprising the image data of the designated lines stored in the image data line memory are pixels comprising edge portions of a line drawing, and finding a brightness value of each pixel excluding the effects of the brightness of the edge portions in the line drawing, in said lines being processed, wherein, when the pixels do not comprise the edge, finding brightness values of the pixels being processed using a computation on the basis of the brightness values of pixel positions corresponding to a line processed prior to the designated line, and updating the brightness values processed prior using these brightness values which are found, and when the pixels comprise the edge, repeatedly executing a process which maintains without change the brightness values of the pixel positions corresponding to the line processed prior to the designated line for each pixel comprising the designated line, one designated line at a time, and finding through the use of a background predicting process the brightness value of each pixel for each designated line excluding the effects of the brightness of the edge portions in the line drawing;

background prediction line memory that stores the brightness value of each pixel in the lines being processed obtained by the background predicting means;

background prediction modifying means for determining whether or not the effects of the line drawing other than the edge portion is included in the brightness value of each pixel for which the background is predicted in the lines being processed, and for finding the brightness value of each pixel excluding this effect and updating the brightness values of the pixels at corresponding positions of said background prediction line memory to this value that has been found when effects of the line drawing other than the edge portion are included, wherein, when the brightness value for each pixel position in a line being processed is determined to be a desired brightness value or less on the basis of the contents of the background prediction line memory obtained in the background predicting process, the modifying means sets a designated search range which includes the pixels having this brightness value, and finds the change in brightness from the adjacent pixels within this search range for each pixel, and when the number of pixels in which there is little change in brightness within the search range is not less than a preset number, the modifying means determines a brightness value on the basis of the brightness value of the pixels with substantially no change in brightness, and when the number of pixels with substantially no change in brightness in the search range is smaller than a preset number, the modifying means determines the brightness value on the basis of the brightness values of the pixels over the entire search range, and modifies the background prediction results by updating the brightness values of the corresponding pixel positions of said background prediction line memory to the brightness values which are determined; and, background correcting means for correcting the brightness so that the content of said image data line memory achieves the desired brightness, based on the content of the background prediction line memory which stores the results after modification by the background prediction modifying means, by comparing the results modified by said background prediction modifying means and the brightness value set as the desired value, and finding the difference between these, and modifying the brightness to the desired brightness by adding the difference that is found to the brightness value of the corresponding pixel position of image data line memory.

9. An image processing apparatus, comprising:

an image data line memory that stores data of designated lines of input image data;

background predicting means for determining for each designated line of input image data whether or not pixels that comprise the designated line are pixels that comprise an edge portion of a line drawing, and when the pixels do not comprise the edge, finding brightness values of the pixels being processed using a computation on the basis of the brightness values of pixel positions corresponding to a line processed prior to the designated line, and updating the brightness values processed prior using these brightness values which are found, and when the pixels comprise the edge, repeatedly executing a process which maintains without change the brightness values of the pixel positions corresponding to the line processed prior to the designated line for each pixel comprising the designated line, one designated line at a time, and finding through the use of a background predicting process the brightness value of each pixel for each designated line excluding the effects of the brightness of the edge portions in the line drawing;

a background prediction line memory that stores the brightness value of each pixel in the lines being processed obtained by the background predicting means;

background prediction modifying means which, when the brightness value for each pixel position in a line being processed is determined to be a desired brightness value or less on the basis of the contents of the background prediction line memory obtained in the background predicting process, sets a designated search range which includes the pixels having this brightness value, and finds the change in brightness from the adjacent pixels within this search range for each pixel, and when the number of pixels in which there is substantially no change in brightness within the search range is not less than a preset number, determines a brightness value on the basis of the brightness value of the pixels with substantially no change in brightness, and when the number of pixels with little change in brightness in the search range is smaller than a preset number, determines the brightness value on the basis of the brightness values of the pixels over the entire search range, and modifies the background prediction results by updating the brightness values of the corresponding pixel positions of said background prediction line memory to the brightness values which are determined; and, background correcting means for comparing the results modified by said background prediction result modification means and the brightness value set as the desired value, and finding the difference between these, and modifying the brightness to the desired brightness by adding the difference that is found to the brightness value of the corresponding pixel position of image data line memory.

10. The image processing apparatus as defined in claim 9, wherein the background predicting means for finding brightness values of the pixels using a computation finds the average of the brightness values of the pixel positions corresponding to the lines processed prior to the designated line and the brightness values of the pixels currently being processed.

11. An image processing apparatus, comprising:

an image data line memory that stores data of designated lines of input image data;

shading correction means for correcting shading of the image data for each designated line on the basis of the image data stored in this image data line memory;

threshold value computation means for acquiring data to find n−1 threshold values necessary in converting an image into n values, n being an integer greater than 1, from the image data stored in said image data line memory, and after data acquisition for a specific line is completed, finding n−1 threshold values, n being an integer; and n value conversion process means for converting the image that has undergone shading correction by said shading correction means into n values, using said n−1 threshold values;

natural image gradation process means for accomplishing a two-dimensional gradation process on images other than line drawings; and selection means for selecting said natural image gradation process means or a line drawing gradation process means comprising said threshold value computation means, shading correction means and n value conversion process means in accordance with a determination from a line drawing determination means as to whether the image is a line drawing, wherein when the image is a line drawing, a gradation process including shading correction is accomplished by said line drawing gradation process means, and when the image is not a line drawing, a gradation process is accomplished by said natural image gradation process means.

12. An image processing apparatus, comprising:

an image data line memory that stores data of designated lines of input image data;

line drawing determination means for acquiring data necessary to determine, in each designated line, whether or not the image data is a line drawing on the basis of the image data stored in the image data line memory, and after the data is acquired for a specific line, determining whether or not the image data is a line drawing;

shading correction means for correcting shading of the image data for each designated line on the basis of the image data stored in the image data line memory;

switching means which, upon receiving from said line drawing determination means the result that the image is a line drawing, provides the contents of said image data line memory to the shading correction means;

natural image gradation process means for accomplishing a two-dimensional gradation process on images other than line drawings; and selection means for selecting said natural image gradation process means or a line drawing gradation process means comprising a threshold value computation means, said shading correction means and said n value conversion process means in accordance with the determination from said line drawing determination means as to whether the image is a line drawing, wherein when the image is a line drawing a gradation process including shading correction is accomplished by said line drawing gradation process means, and when the image is not a line drawing, a gradation process is accomplished by said natural image gradation process means.

13. An image processing apparatus, comprising:

an image data line memory that stores data of designated lines of input image data;

line drawing determination means for acquiring data necessary to determine, in each designated line, whether or not the image data is a line drawing on the basis of the image data stored in the image data line memory, and after the data is acquired for a specific line, determining whether or not the image data is a line drawing;

threshold value computation means for acquiring threshold data used to find n−1 threshold values necessary in converting an image into n values, n being an integer greater than 1, from the image data stored in said image data line memory, and after the threshold data is acquired for a specific line, finding n−1 threshold values;

shading correction means for correcting shading of image data for each designated line on the basis of the image data stored in this image data line memory;

n value conversion process means for converting the image that has undergone shading correction by said shading correction means into n values, using said n−1 threshold values;

natural image gradation process means for accomplishing a two-dimensional gradation process on images other than line drawings; and selection means for selecting said natural image gradation process means or a line drawing gradation process means comprising said threshold value computation means, shading correction means and n value conversion process means, in accordance with the determination from said line drawing determination means as to whether the image is a line drawing, wherein when the image is a line drawing, a gradation process including shading correction is accomplished by said line drawing gradation process means, and when the image is not a line drawing, a gradation process is accomplished by said natural image gradation process means.

14. The image processing apparatus of claim 13, wherein the shading correction means comprises:

an image data line memory that stores the data of designated lines of input image data;

background predicting means for determining for each designated line of image data stored in the image data line memory, whether or not the pixels comprising that designated line are pixels comprising an edge portion of a line drawing, and when the pixels are not pixels comprising the edge, finding the brightness values of the pixels being processed using a computation on the basis of the brightness values of corresponding pixel positions of lines processed prior to the designated line, and updating the brightness values processed prior to this by the brightness value that are found, and when the pixels comprise the edge, repeatedly conducting a process that maintains without change the brightness values of the corresponding pixel positions of the lines processed prior to this for each pixel comprising that designated line, one designated line at a time, and finding the brightness values of each pixel excluding the effects of the brightness of the edge portions in the line drawing for each line;

a background prediction line memory that stores the brightness value of each pixel in the lines being processed obtained by the background predicting means;

background prediction modifying means for setting a designated search range, which includes the pixels having a desired brightness value, when the brightness value for each pixel position in a line being processed is determined to be the desired brightness value or less on the basis of the contents of the background prediction line memory obtained by said background predicting means, and for finding the change in brightness from adjacent pixels within the search range for each pixel, and when a number of pixels in which there is substantially no change in brightness within the search range is not less than a preset number, determining the brightness value on the basis of the brightness value of the pixels with substantially no change in brightness, and when the number of pixels with little change in brightness in the search range is smaller than a preset number, determining the brightness value on the basis of the brightness values of the pixels over the entire search range, and modifying the contents of the corresponding pixel positions in said background prediction line memory to be updated to said determined brightness values; and, background correcting means for comparing the results of modification by said background prediction results modification means and the brightness value set as the desired value, and for finding the difference between these, and correcting the brightness to the desired brightness value by adding the difference that is found to the brightness values of the corresponding pixel positions of said image data line memory.

15. The image processing apparatus as defined in claim 14, wherein the background predicting means for finding brightness values of the pixels using a computation finds the average of the brightness values of the pixel positions corresponding to the lines processed prior to the designated line and the brightness values of the pixels currently being processed.

* * * * *